United States Patent [19]

Kabuto et al.

[11] Patent Number: 5,151,689

[45] Date of Patent: Sep. 29, 1992

[54] DISPLAY DEVICE WITH MATRIX-ARRANGED PIXELS HAVING REDUCED NUMBER OF VERTICAL SIGNAL LINES

[75] Inventors: Nobuaki Kabuto; Mayumi Igarashi; Fumio Inoue; Kunio Ando, all of Yokohama, Japan

[73] Assignee: Hitachi, Ltd., Tokyo, Japan

[21] Appl. No.: 341,789

[22] Filed: Apr. 21, 1989

[30] Foreign Application Priority Data

Apr. 25, 1988 [JP] Japan .................. 63-100304

[51] Int. Cl.⁵ .................................. G01G 3/36
[52] U.S. Cl. .................... 340/784; 359/59; 359/68
[58] Field of Search ............ 340/784, 705, 718, 719, 340/715, 805; 350/332, 333, 334; 359/59, 68; 358/236, 241

[56] References Cited

U.S. PATENT DOCUMENTS

| | | | |
|---|---|---|---|
| 4,368,523 | 1/1983 | Kawate | 350/334 |
| 4,770,501 | 9/1988 | Tamura et al. | 350/333 |
| 4,775,861 | 10/1988 | Saito | 340/784 |
| 4,855,724 | 8/1989 | Yang | 340/703 |
| 4,931,787 | 6/1990 | Shannon | 340/784 |

FOREIGN PATENT DOCUMENTS

| | | |
|---|---|---|
| 0189214 | 7/1986 | European Pat. Off. |
| 0087753 | 2/1978 | Japan |
| 0145597 | 7/1986 | Japan |
| 0015599 | 1/1987 | Japan |
| 0026084 | 2/1988 | Japan |
| 0267694 | 10/1989 | Japan |

OTHER PUBLICATIONS

Morozumi, B/W and Full Color L.C Displays Addressed by Poly-SiTFTs, 1984; pp. 317-318; SiD84 Digest.

Primary Examiner—Jeffery A. Brier
Assistant Examiner—Chanh Nguyen
Attorney, Agent, or Firm—Antonelli, Terry, Stout & Kraus

[57] ABSTRACT

In a display panel including a plurality of signals lines along a column direction and a plurality of scanning lines along a row direction for applying a display signal to display elements forming pixels arranged in a matrix form of rows and columns on a substrate, a switching arrangement for connecting at least two display elements to a signal line in each row is line-sequentially scanned by the scanning lines so that the display signal is time-serially applied through the same signal line to each of the at least two display elements connected to that signal line. Thereby, total number of the signal lines can be reduced to a value equal to or smaller than the number of display elements in the row direction.

15 Claims, 22 Drawing Sheets (2ND FIELD)

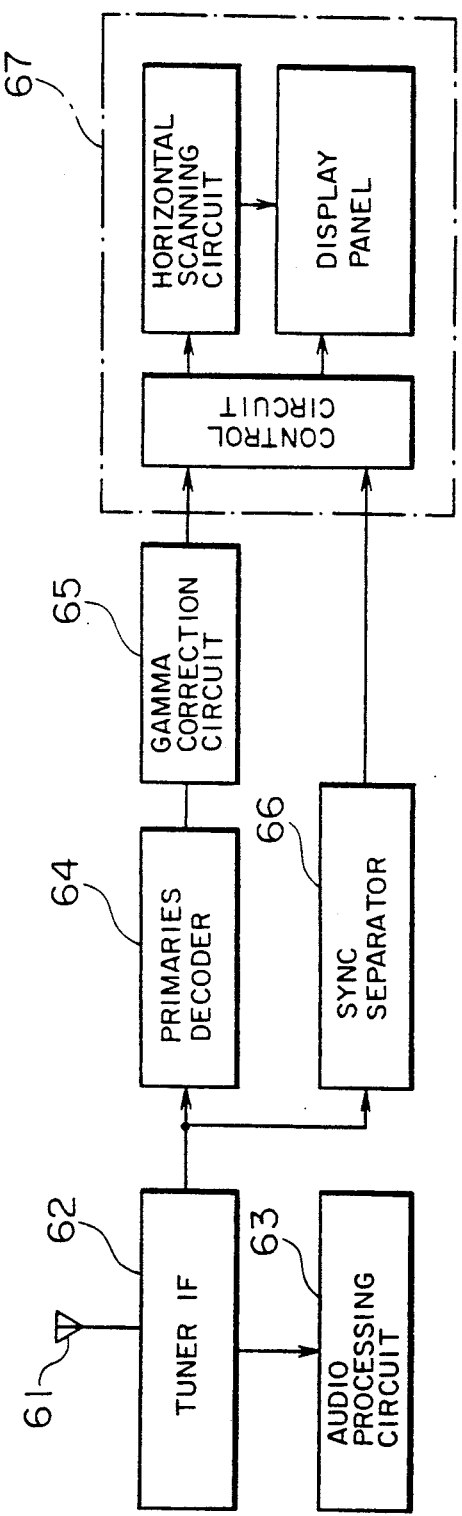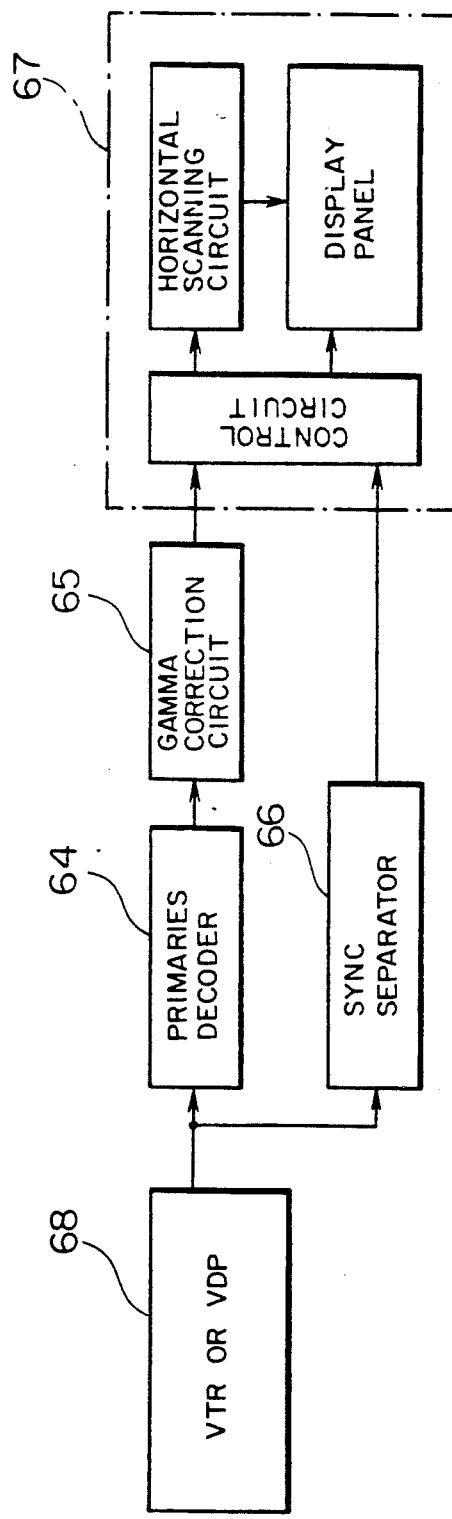

DISPLAY DEVICE WITH MATRIX-ARRANGED PIXELS HAVING REDUCED NUMBER OF VERTICAL SIGNAL LINES

BACKGROUND OF THE INVENTION

The present invention relates to an active matrix display device, and more particularly to a driving circuit arrangement effective for realization of such a device which is low in cost and small in size and can be fabricated with a high yield.

JP-A-61-145597 has proposed a display device in which the number of connection lines between an active matrix display panel and a driving circuit is reduced in such a manner that a plurality of groups of signal lines (termed source wirings or lines) are connected to signal distributing TFT's (thin film transistors) respectively and one of the signal lines to which a signal is to be inputted is selected by the signal distributing TFT.

JP-A-62-15599 has proposed a display device in which the number of connection lines between an active matrix display panel and an external mounted driving circuit is reduced by incorporating a simple matrix switching circuit into the display panel as a part of a vertical scanning circuit.

In the display device disclosed by the JP-A-61-145597, the turn-on resistance of the signal distributing TFT must be made sufficiently small in order that a signal supplied from the external mounted driving circuit is correctly transferred to each signal line. Therefore, the size of the TFT must be made large. As a result, there are problems that it is difficult to make the turn-off resistance of the TFT sufficiently large and a large change in gate voltage of the TFT upon turn-off thereof is induced by a stray capacitance between the gate and source of the TFT and propagated to the signal line.

The JP-A-62-15599 is silent to the reduction in number of connection lines between such an external mounted horizontal driving circuit and a liquid crystal panel.

SUMMARY OF THE INVENTION

An object of the present invention is to further reduce the number of connection lines between an external mounted driving circuit and a display panel, thereby improving the yield concerned in the matter of connection and to reduce the number of driving IC's used in the external mounted driving circuit, thereby providing a device of low cost and making small the size of a display module including the driving circuit.

To achieve the above object, according to one typical aspect of the present invention, a so-called multiplexing in which a plurality of pixels aligned in one row are scanned alternately by two scanning lines and pixels aligned in two columns are connected to one signal line and driven in a time-serial manner is implemented with the number of signal lines being one half of the number of pixels in a horizontal direction and with the number of scanning lines being two times as many as the number of pixels in a vertical direction and a driving circuit on the scanning line side is incorporated into the display panel while the signal line side is scanned at a doubled speed.

By reducing the number of signal lines to one half of the number of pixels in the horizontal direction, the number of connection lines between the signal lines and an external mounted driving circuit can be reduced to half and the number of signal line driving IC's forming the external mounted driving circuit can be reduced to half. Though the number of scanning lines is increased to two times as many as the number of pixels in the vertical direction, the incorporation of the scanning line driving circuit into the display panel makes it possible to make the number of connection lines between the external mounted driving circuit and the scanning line driving circuit in the display panel less than the number of pixels in the vertical direction, thereby reduction the number of scanning line driving IC's forming the external mounted driving circuit.

Thus, since the number of connection lines between the display panel and the external mounted driving circuit can be reduced and the number of external mounted driving IC's can be also reduced, a low-cost and a small-sized display module can be realized.

BRIEF DESCRIPTION OF THE DRAWINGS

FIG. 29 is a block diagram of a color television in which an image display device according to the present invention is used;

FIG. 30 is a block diagram of a color monitor in which an image display device according to the present invention is used.

DESCRIPTION OF THE PREFERRED EMBODIMENTS

Figure 1A:
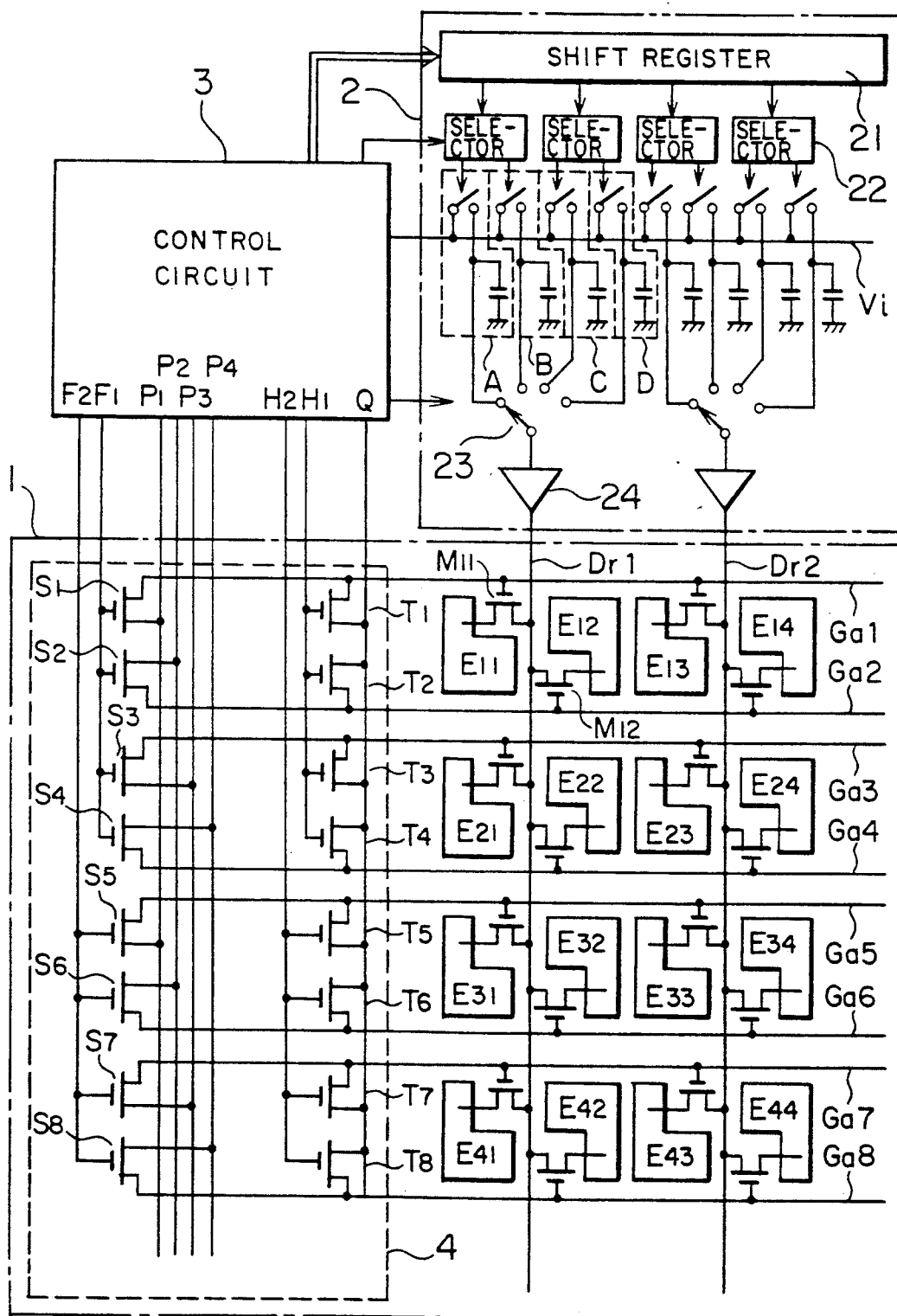
FIG. 1A is a circuit diagram showing the construction of an image display device according to an embodiment of the present invention.

FIG. 1A shows the construction of an embodiment of the present invention. In FIG. 1A reference numeral 1 designates an active matrix display panel having a vertical scanning function part formed on a substrate, numeral 2 a horizontal scanning circuit, and numeral 3 a control circuit.

Figure 2:
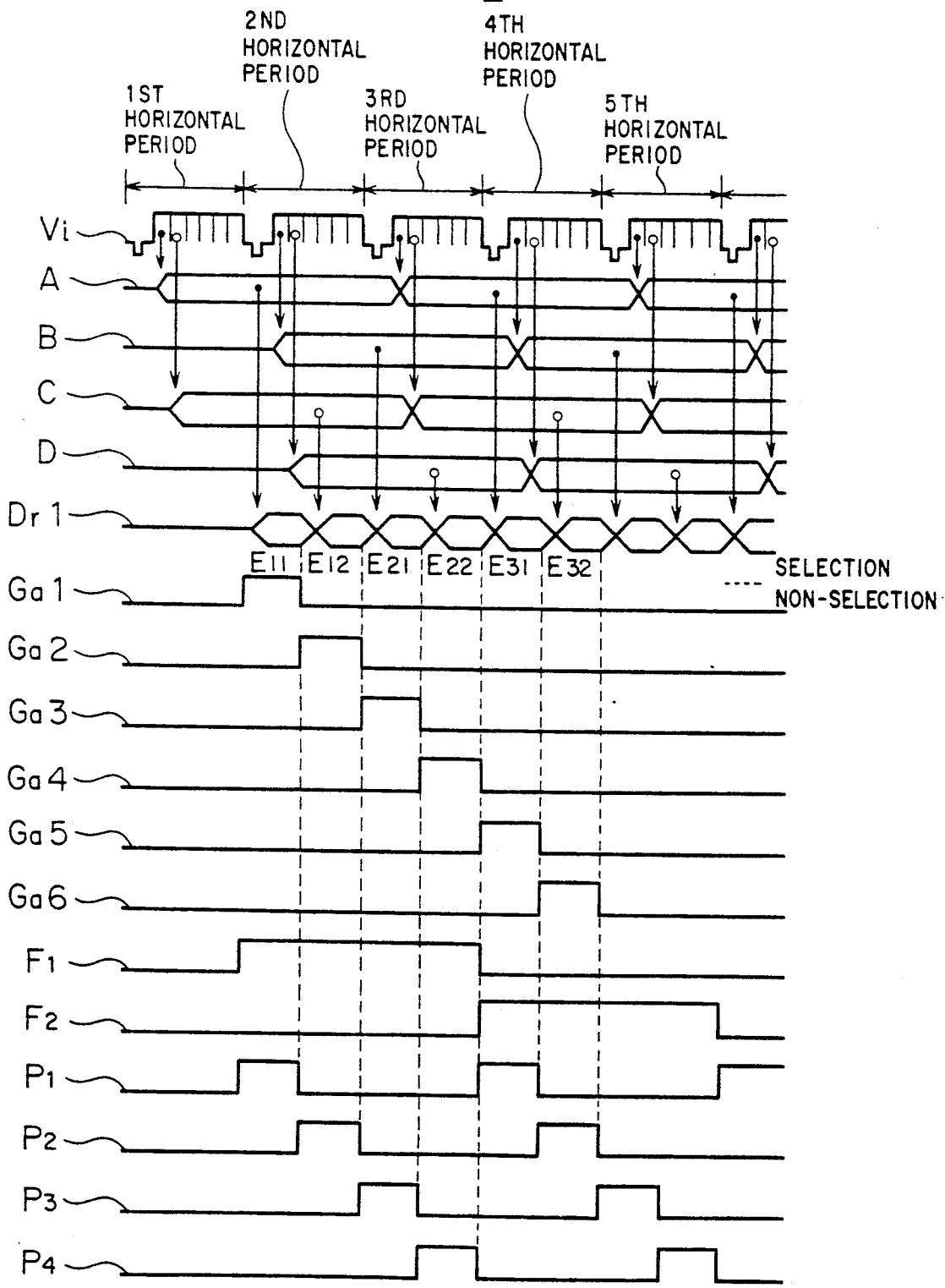
FIG. 2 is a view showing an example of waveforms for explaining the operation of the embodiment shown in FIG. 1A.

The embodiment shown in FIG. 1A will now be explained by virtue of an example of operating waveforms shown in FIG. 2 in the case where an image display signal $V_i$ is a television signal of NTSC system.

The horizontal scanning circuit 2 is composed of a shift register 21, gate circuits or selectors 22 for selecting control inputs for register 21, gate circuits or selectors 22 for selecting control inputs for sample hold circuits, the sample hold circuits A, B, C and D each of which includes a switch and a capacitor, a switch 23 and an output buffer 24. In the first horizontal period, the sample hold circuits A and C set about their sampling operations with a phase difference therebetween so that image signals corresponding to pixel electrodes $E_{11}$ and $E_{12}$ in the first row are sampled from an image display signal $V_i$. The sampled image signals are outputted by the switch 23 to a signal line $D_{r1}$ through the buffer 24 in the former and later halves of the second horizontal period. Scanning lines $G_{a1}$ and $G_{a2}$ are selected in synchronism with the delivery of the image signals to the signal line $D_{r1}$ in the former and later halves of the second horizontal period so that the image signals corresponding to the positions of the pixel electrodes or pixels $E_{11}$ and $E_{12}$ in the first row are written into the pixel electrodes $E_{11}$ and $E_{12}$ and displayed thereat.

In the second horizontal period, the sample hold circuits B and D set about their sampling operations with a phase difference therebetween so that image signals corresponding to pixel electrodes $E_{21}$ and $E_{22}$ second row are sampled from the image display signal $V_i$. The sampled image signals are outputted by the switch 23 to the signal line $D_{r1}$ through the buffer 24 in the former and later halves of the third horizontal period. Scanning lines $G_{a3}$ and $G_{a4}$ are sequentially selected in synchronism with the delivery of the image signals to the signal line $D_{r1}$ so that the image signals corresponding to the positions of the pixel electrodes or pixels $E_{21}$ and $E_{221}$ in the second row are written into the pixel electrodes $E_{21}$ and $E_{22}$ and displayed thereat.

In the third horizontal period, the sample hold circuits A and C set about their sampling operations as in the first horizontal period. In the fourth horizontal period, the sampled image signals are outputted to the signal line $D_{r1}$ and are written into pixel electrodes $E_{31}$ and $E_{32}$ in the third row. A similar operation is repeated for all of signal lines and all of pixel electrodes connected to the signal lines. In this manner, an image can be displayed. The details of the horizontal scanning circuit 2 are disclosed by JP-A-63-26084.

The basic operation of the vertical scanning function part 4 which provides sequential selection waveforms shifted in phase by a half of one horizontal period to the scanning lines $G_{a1}$, $G_{a2}$, . . . is disclosed in detail by the above-mentioned JP-A-62-15599. The operation of the vertical scanning function part 4 will now be briefly explained. In the second and third horizontal periods, the control circuit 3 outputs a selection level to a vertical control line $F_1$ to turn transistors $S_1$, $S_2$, $S_3$ and $S_4$ on which a vertical control line $H_1$ assumes a non-selection level to turn transistors $T_1$, $T_2$, $T_3$ and $T_4$ off. At this time, sequential selection waveforms each having its duration equal to a half of one horizontal period are applied to vertical signal lines $P_1$, $P_2$, $P_3$ and $P_4$ from the control circuit 3 so that sequential selection waveforms as shown in FIG. 2 are obtained on the scanning lines $G_{a1}$, $G_{a2}$, $G_{a3}$ and $G_{a4}$. In and after the fourth horizontal period, the control circuit 3 brings the vertical control line $F_1$ to a non-selection level to turn the transistors $S_1$, $S_2$, $S_3$ and $S_4$ off while the vertical control line $H_1$ is brought to a selection level to turn the transistors $T_1$, $T_2$, $T_3$ and $T_4$ on. Accordingly, in and after the fifth horizontal period, a nonselection level (or fixed DC level) given on a vertical signal line Q is stably applied on the scanning lines $G_{a1}$, $G_{a2}$, $G_{a3}$ and $G_{a4}$.

In the fourth and fifth horizontal periods, a selection level is applied to a vertical control line $F_2$ to turn transistors $S_5$, $S_6$, $S_7$ and $S_8$ on while a nonselection level is applied to a vertical control line $H_2$ to turn transistors $T_5$, $T_6$, $T_7$ and $T_8$ off. At this time, sequential selection waveforms are applied to the vertical signal lines $P_1$, $P_2$, $P_3$ and $P_4$ so that sequential selection waveforms as shown in FIG. 2 are obtained on scanning lines $G_{a5}$, $G_{a6}$, $G_{a7}$ and $G_{a8}$.

In the case where it is desired to increase the number of scanning lines to be driven, the extension can be easily realized by increasing the number of vertical signal lines and the number of vertical control lines. Namely, at largest k·l scanning lines can be driven by (2k+l+1) output lines of the control circuit 3 including (l+1) vertical signal lines ($P_1$, $P_2$, $P_3$, $P_4$, Q) and 2k vertical control lines ($F_1$, $F_2$, $H_1$, $H_2$) (l=4 and k=2 in FIG. 1A).

Figure 1B:
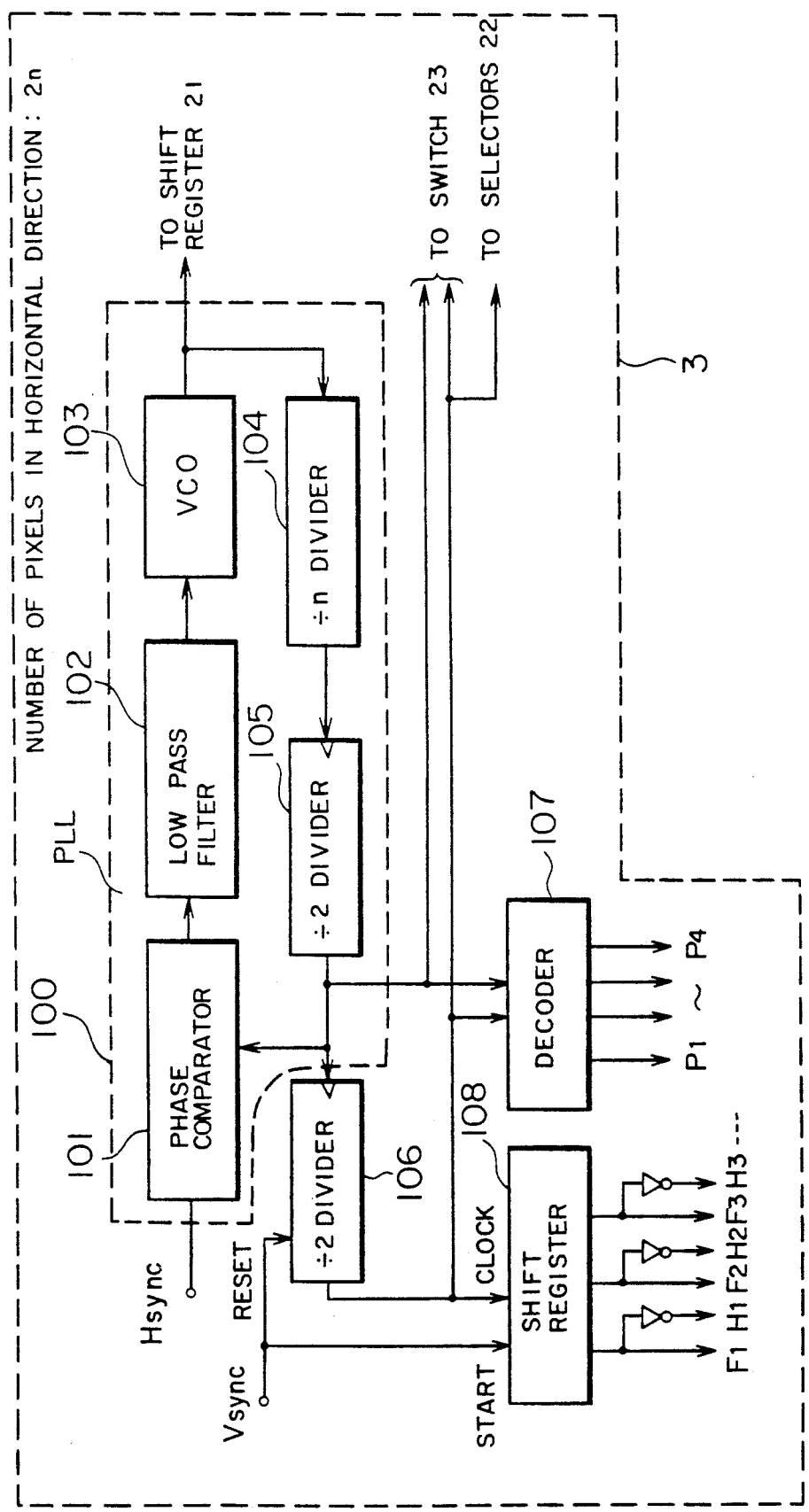
FIG. 1B is a block diagram showing an example of a control circuit shown in FIG. 1A.

An example of the control circuit 3 is shown in FIG. 1B. Assume that the number of pixels in a horizontal direction is 2n. In order to form clocks for the horizontal scanning circuit 2, a horizontal sync signal $H_{sync}$ or reference signal is multiplied by 2n by a PLL 100 which includes a phase comparator 101, a low pass filter 102, a voltage controlled oscillator (VCO) 103, a ÷n divider 104 and a ÷2 divider 105. Since change-over between the sample hold circuits A and B and change-over between the sample hold circuits C and D are to be made every one horizontal period, the gate circuits or selectors 22 are controlled by the output of a ÷2 divider 106 to which the output of the ÷2 divider 105 or the 2n-divided version of the oscillated clock obtained by the PLL 100 is inputted. The change-over switch 23 to be switched every one half of the horizontal period is controlled by the output of the ÷2 divider 105 (or the 2n-divided version of the oscillated clock) and the output of the ÷2 divider 106 (or the 4n-divided version of the oscillated clock). Similarly, the vertical signals lines $P_1$ to $P_4$ are controlled through a decoder 107 by the output of the ÷2 divider 105 and the output of the ÷2 divider 106. Vertical control waveforms $F_1$, $F_2$, $F_3$, ... and inverted waveforms $H_1$, $H_2$, $H_3$, ... thereof are formed by a shift register 108 to which the output of the ÷2 divider 106 (or the 4n-divided version of the oscillated clock) is applied as a clock input.

In the embodiment shown in FIG. 1A, the number of signal lines $D_r$ is reduced to one half of the number of pixels in the horizontal direction. Though the number of scanning lines $G_a$ is increased to two times as many as the number of pixels in one column along the vertical direction, the total number of lines drawn out of the active matrix display panel 1 is reduced since the vertical scanning function part 4 is formed on the active matrix display panel 1. For example, in the case where a display panel including pixels the number of which is 480 (in the horizontal direction)×240 (in the vertical direction) is to be driven, the conventional device according to the above-mentioned JP-A-62-15599 requires 525 lines including 480 signal lines which are equal in number to the pixels in the horizontal direction and (24+1) vertical signal lines and (2×10) vertical control lines which are used for driving 240 scanning lines equal in number to the pixels in the vertical direction. On the other hand, the embodiment shown in FIG. 1A requires only 303 lines including 240 signal lines which are equal in number to the pixels in the horizontal direction and (30+1) vertical signal lines and (2×16) vertical control lines which are used for driving 480 scanning lines equal in number to two times as many as the pixels in the vertical direction. The present embodiment provides effects that the yield concerned in the matter of connection and the reliability can be improved and an area required for connection portions can be reduced. In the case where the horizontal scanning circuit 2 is constructed by IC's or the like, the number of sample hold circuits per one output required in the embodiment shown in FIG. 1A is increased from 2 (in the conventional device disclosed by the JP-A-62-15599) to 4 and hence the cost per one horizontal scanning IC 2 is slightly increased. However, since the number of signal lines to be driven is reduced to half and hence the number of horizontal scanning IC's used is also reduced to half, the cost of the entire horizontal scanning circuit 2 in the present embodiment can be advantageously lowered as compared with that in the conventional device.

In the conventional device of the above-mentioned JP-A-61-145597 in which the number of signal lines drawn out of the active matrix display panel is reduced as compared with the number of pixels in the horizontal direction, there is the problem of turn-on resistance of the signal distributing transistors interposed between the drawn-out signal lines and those contained in the display panel. In the embodiment shown in FIG. 1A, this problem is eliminated since no signal distributing transistor is required.

Figure 3:
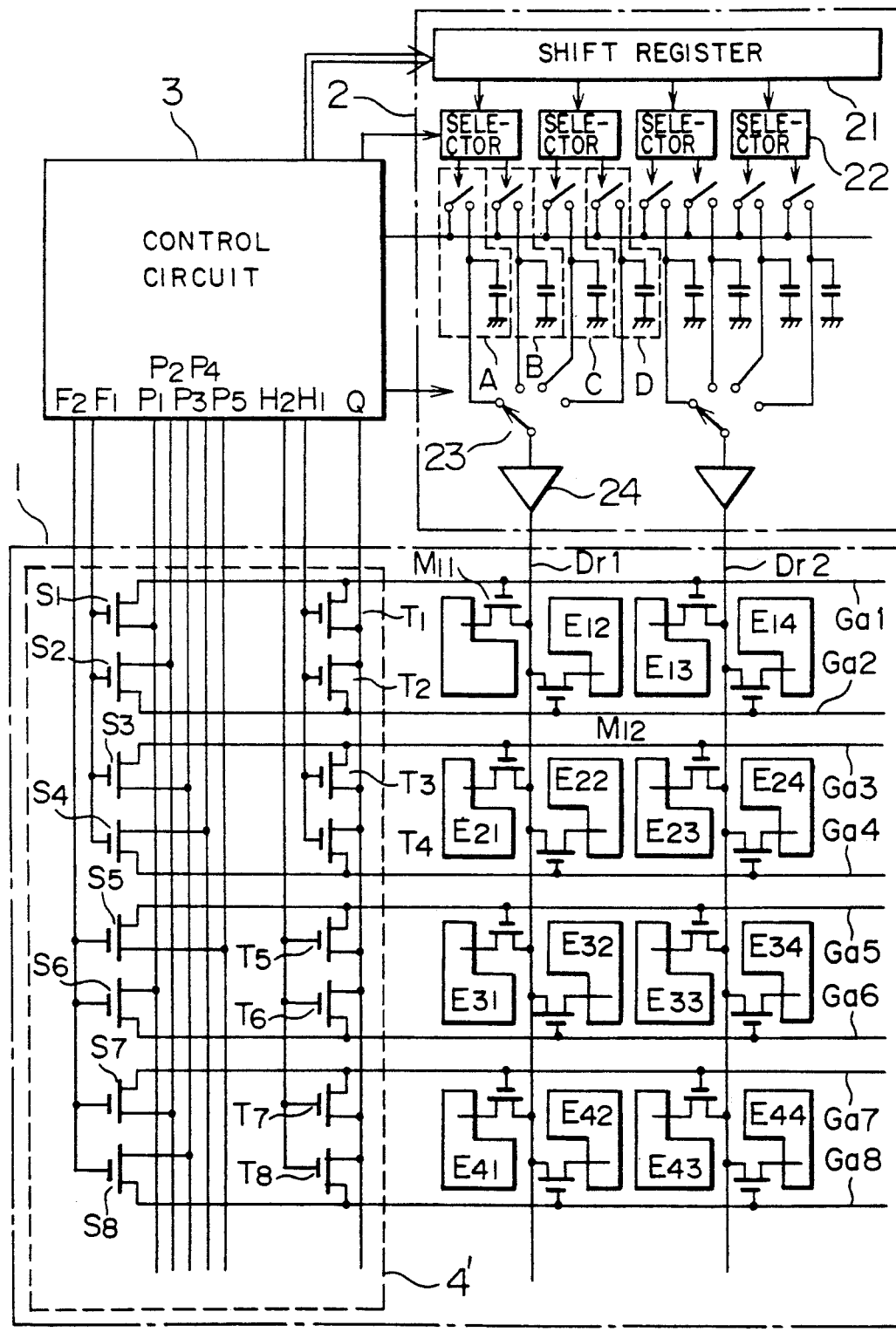
FIG. 3 is a circuit diagram showing the construction of an image display device according to another embodiment of the present invention.
Figure 4:
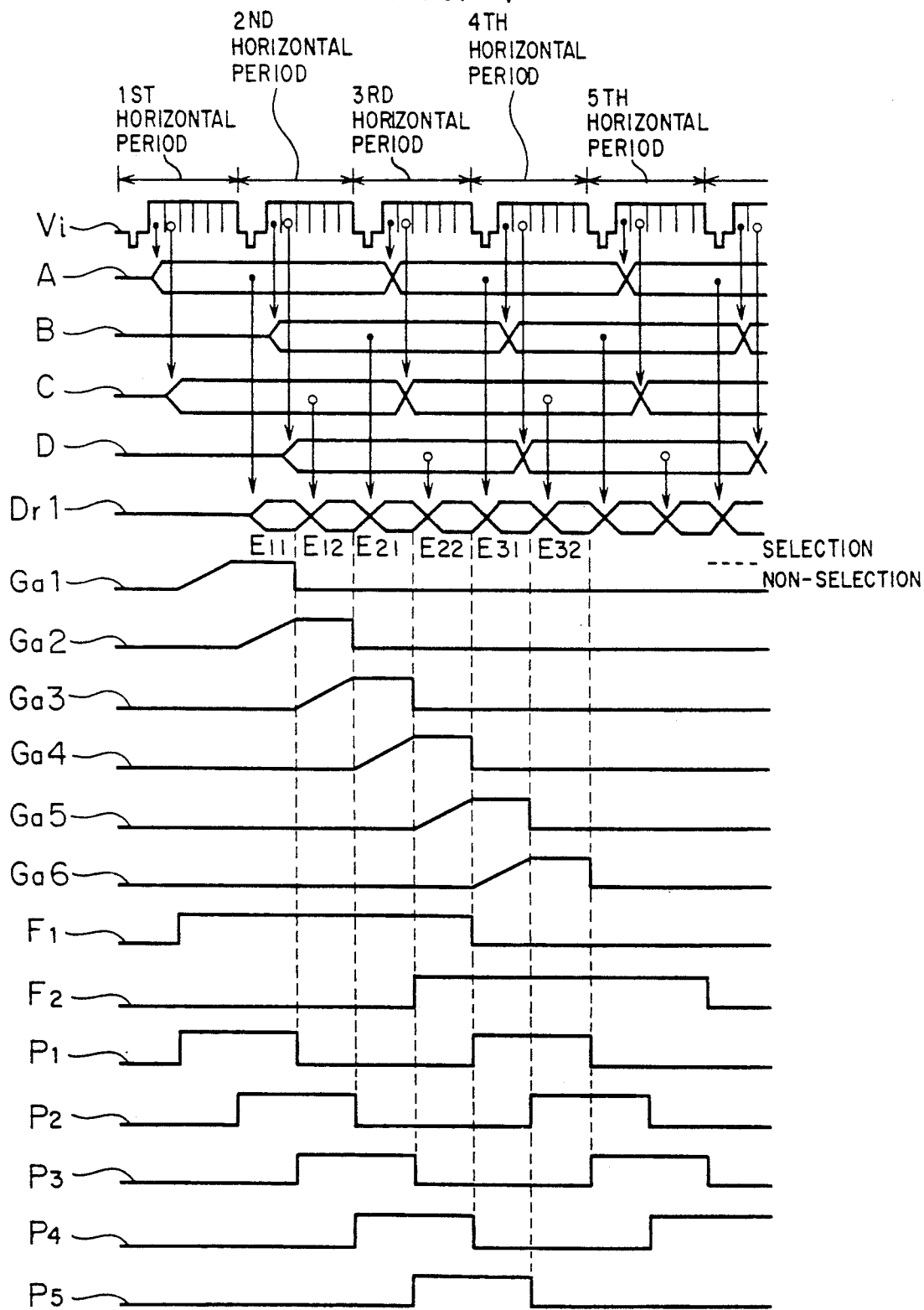
FIG. 4 is a view showing an example of waveforms for explaining the operation of the embodiment shown in FIG. 3.

FIG. 3 shows the construction of another embodiment of the present invention in which a vertical scanning function part 4' is realized with a construction different from the vertical scanning function part 4 in FIG. 1A. FIG. 4 shows an example of operating waveforms. The construction shown in FIG. 3 is different from the construction of FIG. 1A in that a vertical signal line $P_5$ is additionally provided.

The operation of the vertical scanning function part 4' will first be explained. In a time from the later half of the first horizontal period to the later half of the third horizontal period, a vertical control line $F_1$ is brought to a selection level so that transistor $S_1$, $S_2$, $S_3$ and $S_4$ are turned on while a vertical control line $H_1$ providing substantially an inverted version of the level of the vertical control line $F_1$ is brought to a non-selection level so that transistors $T_1$, $T_2$, $T_3$ and $T_4$ are turned off. At this time, if sequential selection waveforms each of which has a duration equal to one horizontal period and which are different in phase from each other by a half of one horizontal period are applied to vertical signal lines $P_1$, $P_2$, $P_3$ and $P_4$ from a control circuit 3, sequential selection waveforms as shown in FIG. 4 are obtained on scanning lines $G_{a1}$, $G_{a2}$, $G_{a3}$ and $G_{a4}$. The selection duration of the signal applied to the vertical signal line is thus made two times as long as that in example shown in FIG. 2. Therefore, even in the case where the turn-on resistance of the transistor upon inputting a scanning line selecting level signal is large so that the waveform of a scanning line driving signal rises with an inclined slope portion, as shown in FIG. 4, the duration for selection of the scanning line (or a time for writing of a pixel signal into the transistor) can be ensured and hence a stable display operation can be expected.

In and after the former half of the fourth horizontal period, the control circuit 3 brings the vertical control line $F_1$ to a non-selection level so that the transistors $S_1$, $S_2$, $S_3$ and $S_4$ are turned off while the vertical control line $H_1$ is brought to a selection level so that the transistors $T_1$, $T_2$, $T_3$ and $T_4$ are turned on. Accordingly, in and after the former half of the fourth horizontal period, a non-selection level provided on a vertical signal line Q is stably applied on the scanning lines $G_{a1}$, $G_{a2}$, $G_{a3}$ and $G_{a4}$ as in the embodiment shown in FIG. 1A.

In a time from the later half of the third horizontal period to the later half of the fifth horizontal period, a selection level is applied to a vertical control line $F_2$ so that transistors $S_5$, $S_6$, $S_7$ and $S_8$ are turned on while a non-selection level is applied to a vertical control line $H_2$ so that transistors $T_5$, $T_6$, $T_7$ and $T_8$ are turned off. In the later half of the third horizontal period, since the vertical control lines $F_1$ and $F_2$ are simultaneously brought to the selection levels, the transistors $S_4$ and $S_5$ driving adjacent scanning lines $G_{a4}$ and $G_{a5}$, among the transistors connected to the vertical control lines $F_1$ and $F_2$, are connected to vertical signal lines $P_4$ and $P_5$ which are not connected to the transistors $S_1$, $S_2$, $S_3$, and $S_6$, $S_7$, $S_8$ connected to the other vertical control lines F or $F_2$. Accordingly, signals sequentially selected in a time from the later half of the third horizontal period to the later half of the fifth horizontal period are supplied to scanning lines $G_{a5}$, $G_{a6}$, $G_{a7}$ and $G_{a8}$ from the vertical signal lines $P_5$, $P_1$, $P_2$ and $P_3$ so that signal waveforms as shown in FIG. 4 are obtained. The details of the vertical matrix scanning circuit and the control circuit as has been in the above are disclosed by Japanese Patent Application No. 63-95512.

The vertical scanning function part 4 or 4' may be any circuit by which sequential selection output waveforms are obtained. Accordingly, the vertical scanning function part is limited to the disclosed example. It may be a circuit which has a shift register function.

Also, even if the vertical scanning function part is formed outside of the display panel, the effect of low cost can be attained as a whole since the number of complicated horizontal scanning IC's handling analog signals is reduced though the number of vertical scanning IC's capable of being simply constructed is increased.

Figure 5:
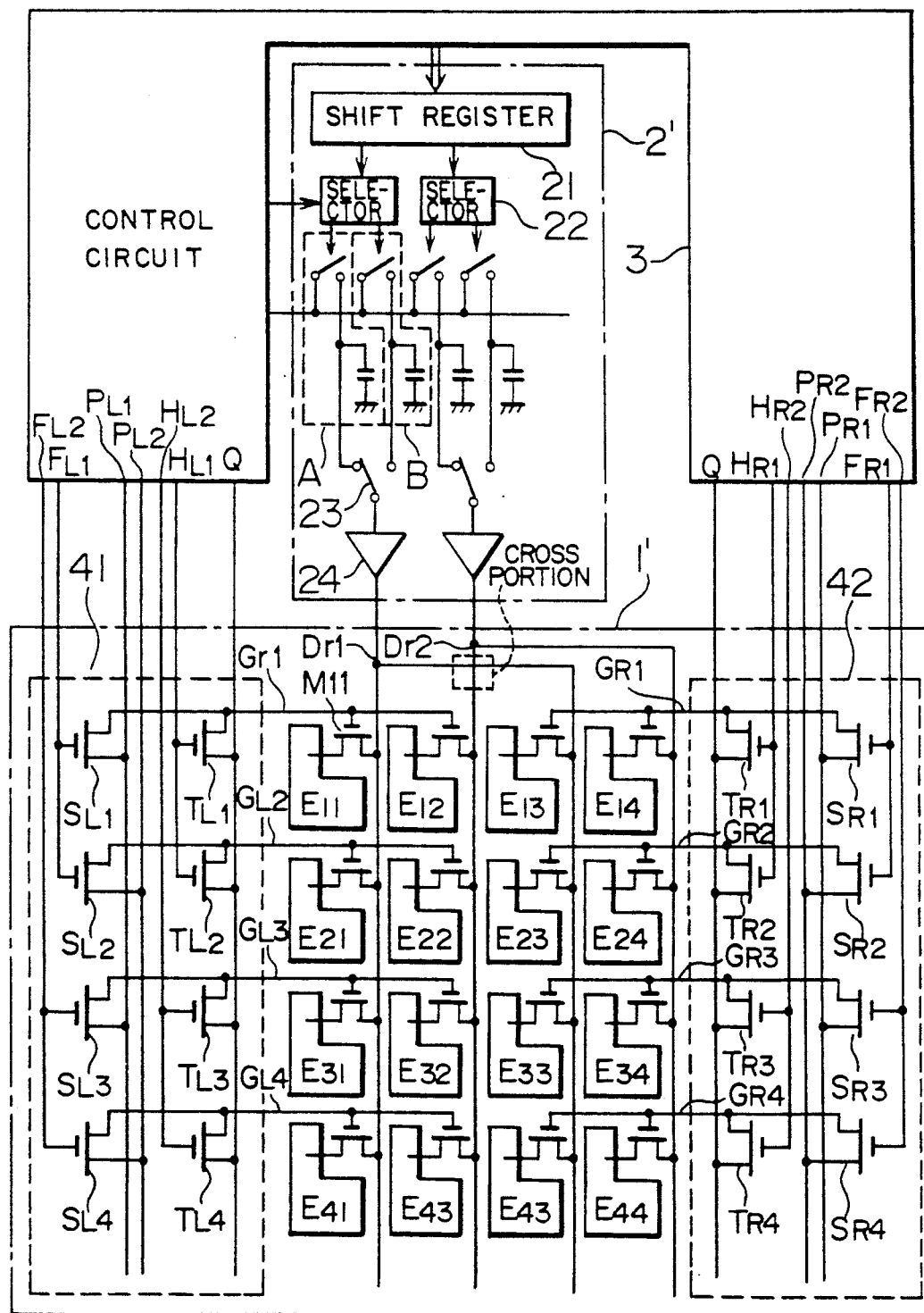
FIG. 5 is a circuit diagram showing the construction of an image display device according to still another embodiment of the present invention.

FIG. 5 shows the construction of still another embodiment of the present invention. The construction of the embodiment shown in FIG. 5 differs from that of the embodiment of FIG. 1A in that vertical scanning function parts 41 and 42 are disposed on left and right sides of an image display part or panel 1' and are connected to scanning lines $G_{Li}$ and $G_{Ri}$ ($i=1, 2, 3, \ldots$) on the left and right sides of the image display part 1' and that a horizontal scanning circuit 2' has two sample hold circuits per one output.

Figure 6:
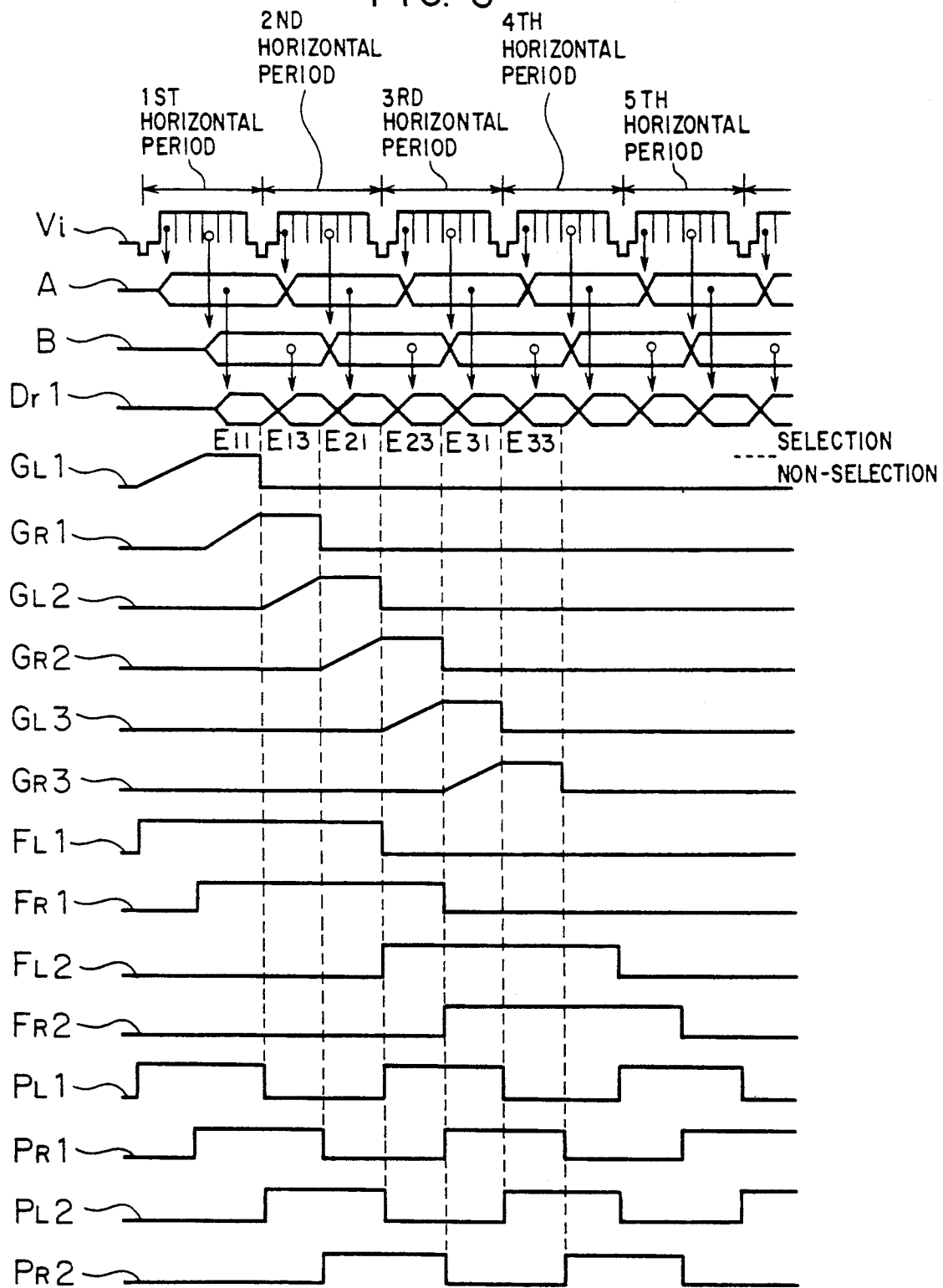
FIG. 6 is a view showing an example of waveforms for explaining the operation of the embodiment shown in FIG. 5.

The operation of the embodiment shown in FIG. 5 will now be explained by virtue of an example of operating waveforms shown in FIG. 6.

In the former half of the first horizontal period, a sample hold circuit A sets about its sampling operation so that an image signal corresponding to a pixel electrode $E_{11}$ in the first row on the left side of the image display part 1' is sampled from an image display signal $V_i$. The sampled image signal is outputted by a switch 23 to a signal line $D_{r1}$ through a buffer 24 in the later half of the first horizontal period. Since a scanning line $G_{L1}$ is selected at this point of time, the image signal is written into the pixel electrode $E_{11}$ in the first row on the left side of the image display part 1'. Simultaneously or in the later half of the first horizontal period, a sample hold circuit B sets about its sampling operation so that an image signal corresponding to a pixel electrode $E_{13}$ in the first row on the right side of the image display part 1' is sampled from the image display signal $V_i$. The sampled image signal is outputted by the switch 23 to the signal line $D_{r1}$ through the buffer 24 in the former half of the second horizontal period. Since a scanning line $G_{R1}$ is selected at this point of time, the image signal is writen into the pixel electrode $E_{13}$ in the first row on the right side of the image displaying part.

In the former half of the second horizontal period, the sample hold circuit A samples an image signal corresponding to a pixel electrode $E_{21}$ in the second row on the left side of the image display part 1'. The sampled image signal is outputted from the signal line $D_{r1}$ in the later half of the second horizontal period to drive the pixel electrode $E_{21}$. In the later half of the second horizontal period, the sample hold circuit B samples an image signal corresponding to a pixel electrode $E_{23}$ in the second row on the right side of the image display part 1'. The sampled image signal is outputted from the signal line $D_{r1}$ in the former half of the third horizontal period to drive the pixel electrode $E_{23}$. A similar operation is repeated in and after the third horizontal period.

Since each of the vertical scanning function parts 41 and 42 has the substantially same construction as the vertical scanning function part 4 in the embodiment shown in FIG. 1A, detailed explanation thereof will be omitted. A feature lies in that signals applied from a control circuit 3 to the vertical scanning function part 42 are delayed in phase by a time equal to a half of one horizontal period as compared with signals applied from the control circuit 3 to the vertical scanning function part 41.

According to the embodiment shown in FIG. 5, since the number of sample hold circuits in the horizontal scanning circuit 2' is reduced to one half of that in the embodiment shown in FIG. 1A, there is an effect that the circuit scale is reduced, thereby providing an image display device of low cost. Also, since the scanning line is shortened, a signal transfer delay becomes small because of the decrease of an impedance.

Figure 7:
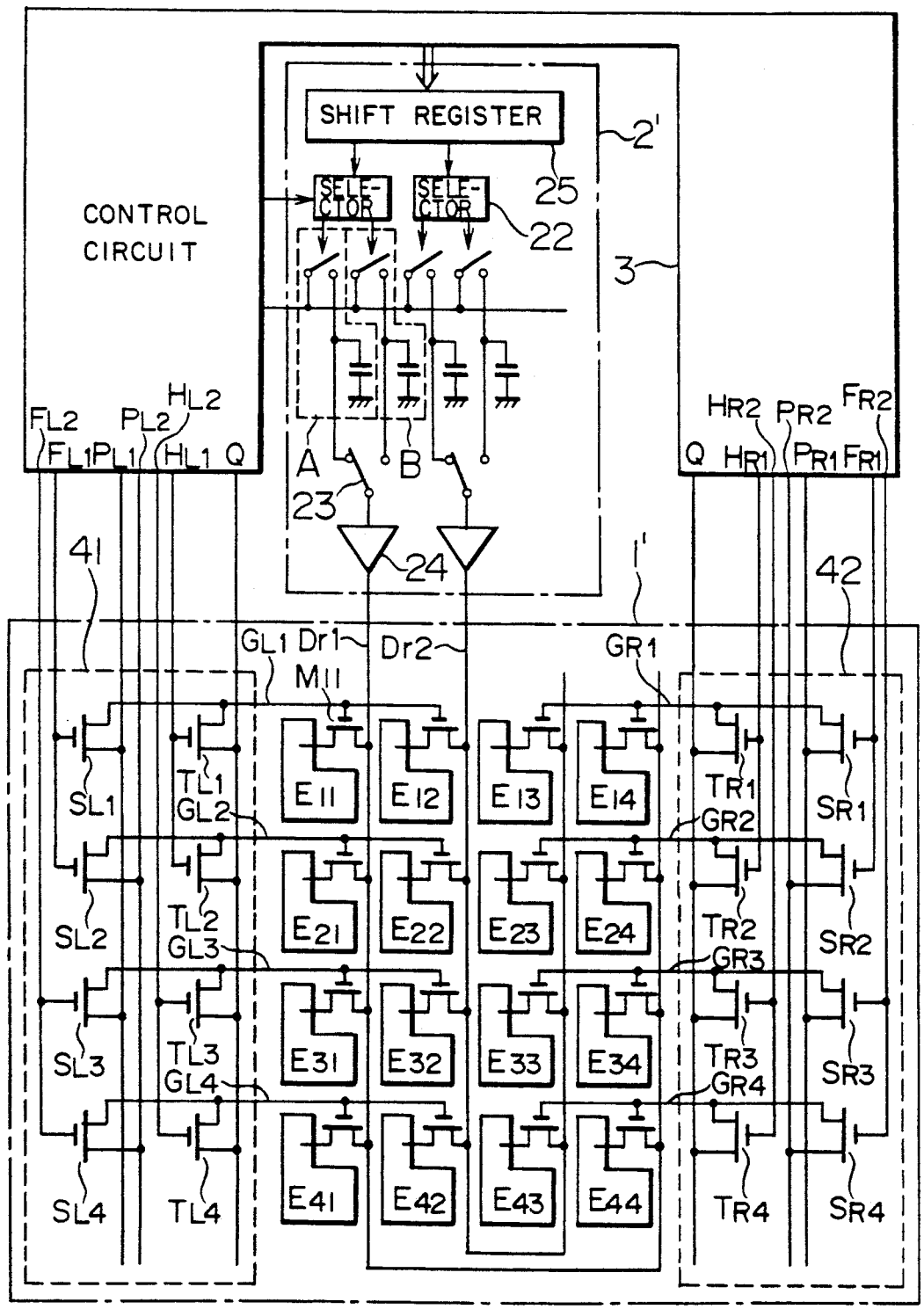
FIG. 7 is a circuit diagram showing the construction of an image display device according to a further embodiment of the present invention.

FIG. 7 shows the construction of a further embodiment of the present invention. The embodiment shown in FIG. 7 differs from the embodiment of FIG. 5 in a manner by which signal lines from the embodiment of FIG. 5 in a manner by which signal lines are connected to the left and right sides of an image display part or panel 1' and in that a shift register 25 has a bi-directional shifting function.

In the embodiment shown in FIG. 5, a crossing portion of signal lines exists as the result of provision of the vertical scanning function parts on the left and right sides of the image display part or panel 1. Therefore, the embodiment of FIG. 5 involves a problem that a process becomes complicated since the signal lines cannot be formed by the same electrode layer in order to prevent any short-circuiting between the signal lines. On the other hand, in the embodiment shown in FIG. 7, a signal line on the left side and a signal line on the right side are connected in a non-crossing manner, thereby preventing a process from being complicated.

Figure 8:
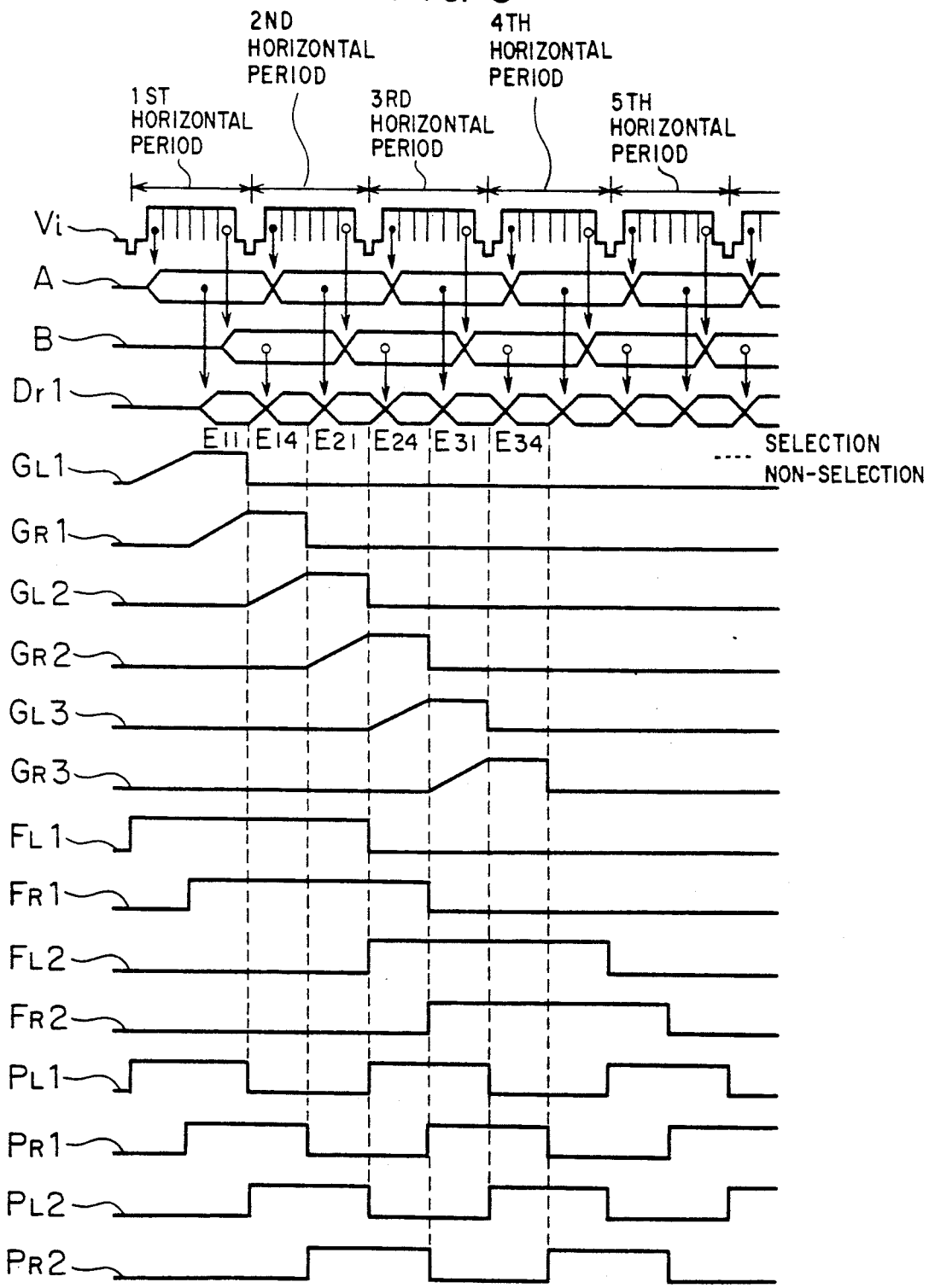
FIG. 8 is a view showing an example of waveforms for explaining the operation of the embodiment shown in FIG. 7.

An example of operating waveforms in the embodiment of FIG. 7 is shown in FIG. 8. Since the leftmost signal line $D_{r1}$ is connected to the rightmost signal line, the timing of sampling by a sample hold circuit B is made at the last portion of an effective display interval of time in each horizontal period though the timing of sampling by a sample hold circuit A is the same as that in the embodiment of FIG. 5. Namely, in a period of time when the sample hold circuit performs its sampling operation (i.e. in the later half of each horizontal period), a shifting operation of a shift register 25 is made in a reverse direction. The operation of the embodiment shown in FIG. 7 is the same as the embodiment of FIG. 5 except the timing of the sampling operation. Therefore, any detailed explanation of the operation of the embodiment of FIG. 7 will be omitted.

Next, examples of the arrangement of signal lines, scanning lines and pixel electrodes in an image display part or panel in the case where a color image display device is implemented by making primaries or three primary colors R (red), G (green) and B (blue) correspond to pixels will be explained referring to FIGS. 9 to 15 which show different embodiments.

Figure 9:
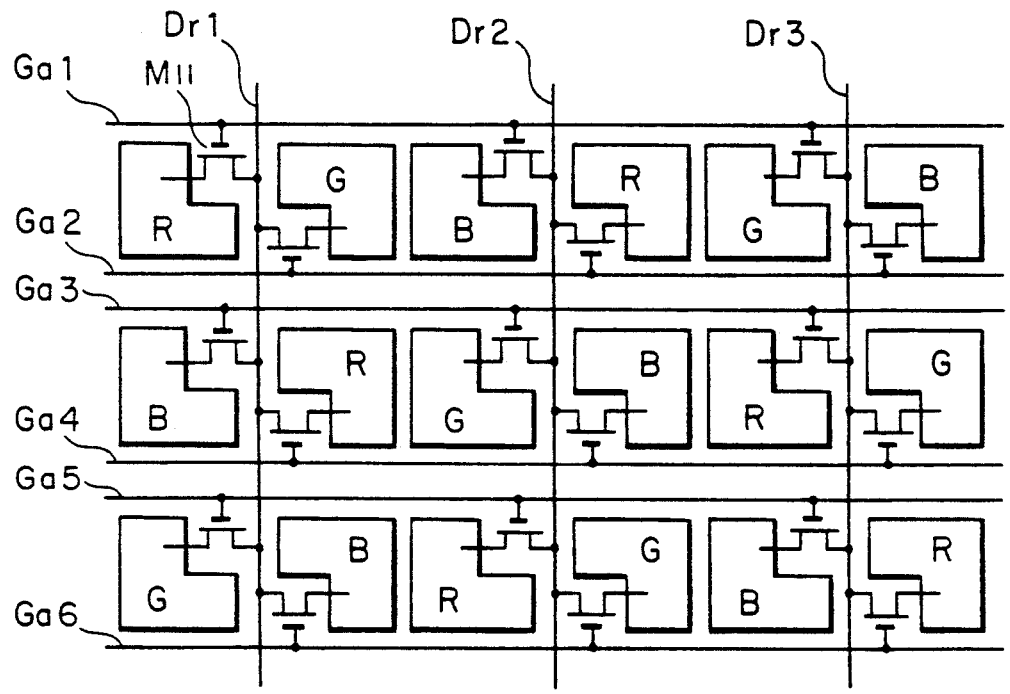
FIGS. 9 to 15 are views for explaining the arrangement of pixels and the arrangement of signal lines in color image display devices according to embodiments of the present invention.
Figure 10:
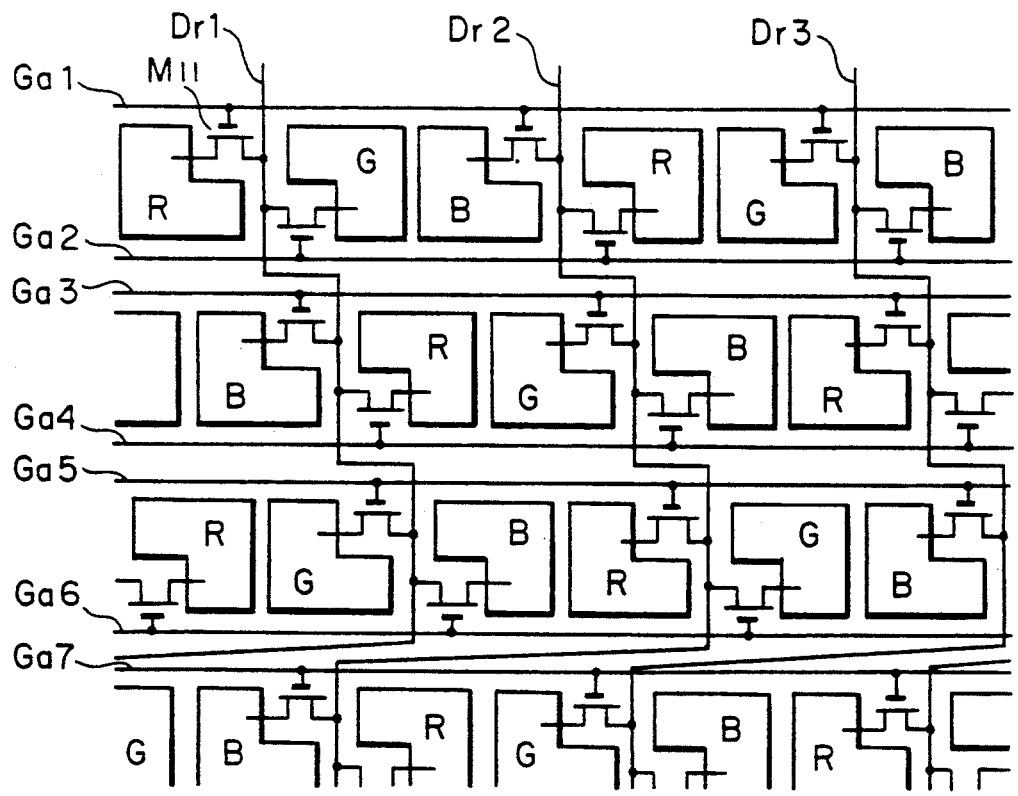

In the embodiment shown in FIG. 9, pixels providing three primary colors are provided in an obliquely mossaic arrangement. In the case where this pixel arrangement is applied to the image display device shown in FIG. 1A or 3, primary-color image signals are sequentially sampled at the order of R→G→B→R→G→B every one half of a horizontal period and applied to a signal line $D_{r1}$.

In the embodiments shown in FIGS. 10 to 15, pixels providing three primary colors are arranged at the apexes of an isosceles triangle to improve the mixture of three primary colors (i.e., the mixed effect of causing an intermediate color dependent upon their lighting degrees) as compared with the embodiment of FIG. 9. In the embodiments shown in FIGS. 10, 11 and 12, a signal line passes between pixels in not a straight line but a zigzag line. In the embodiment shown in FIG. 10 primary-color image signals are sequentially sampled and applied to a signal line $D_{r1}$ at the order of R→G→B→R→G→B every one half of a horizontal period, like the embodiment shown in FIG. 9. In this case, the timing of sampling in each horizontal is determined taking a horizontal resolution into consideration and in compliance with the zigzag form of the signal line, namely, the timings of sampling in the second, third, fourth, fifth, sixth and seventh horizontal periods are delayed from the timing of sampling in the first horizontal period by a half of one horizontal period, delayed from the timing of sampling in the first horizontal period by one horizontal period, in advance of the timing of sampling in the first horizontal period by three seconds of one horizontal period, in advance of the timing of sampling in the first horizontal period of one horizontal period, in advance of the timing of sampling in the first horizontal period by a half of one horizontal period, and the same as the timing of sampling in the first horizontal period, respectively.

Figure 11:
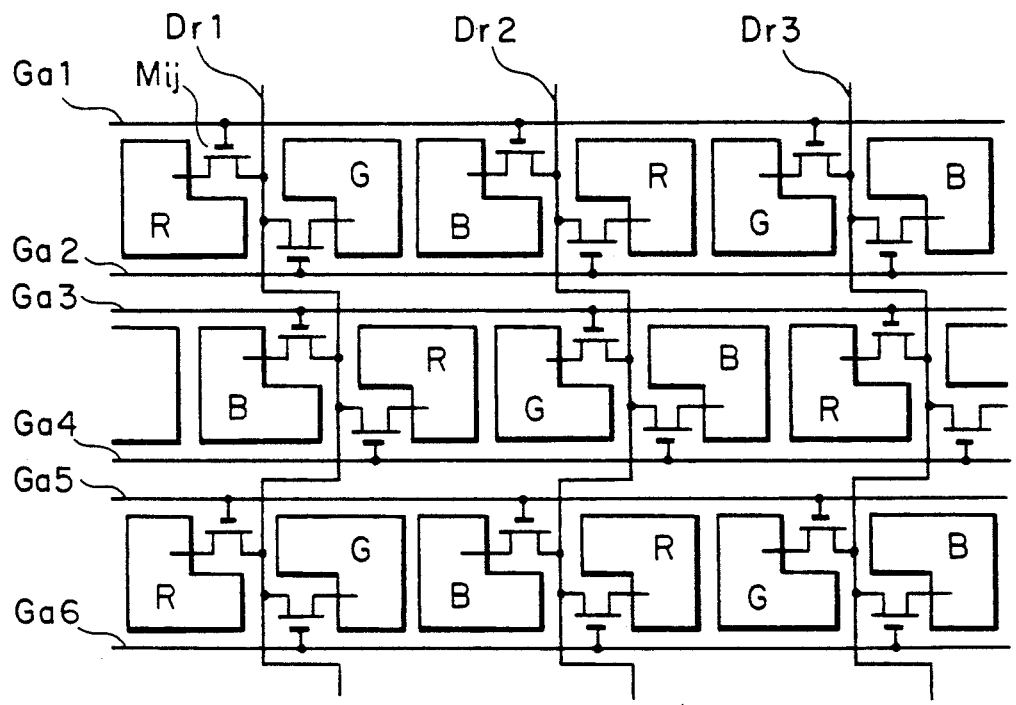

In the embodiment shown in FIG. 11, primary-color image signals are sequentially sampled and applied to a signal line $D_{r1}$ at the order of R→G→B→R every one half of a horizontal period. Taking a horizontal resolution into consideration, the timing of sampling in each horizontal period is determined in compliance with the zigzag form of the signal line so that the timings of sampling in the second and third horizontal periods are delayed from the timing of sampling in the first horizontal period by a half of one horizontal period and the same as the timing of sampling in the first horizontal period, respectively.

Figure 12:
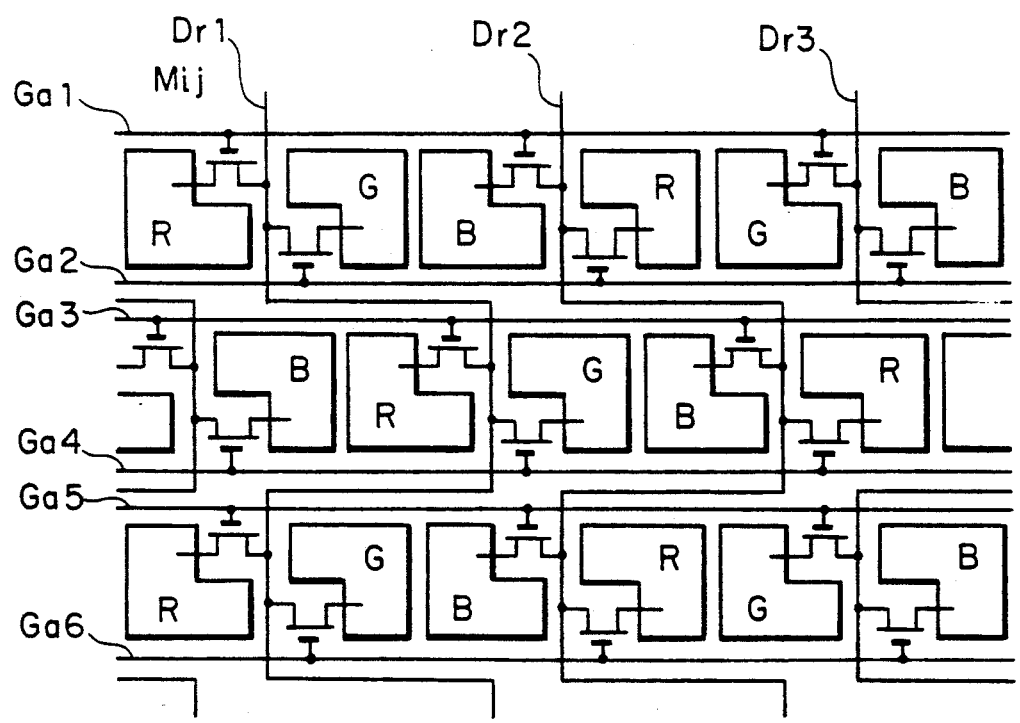

In the embodiment shown in FIG. 12, primary-color image signals are sequentially sampled and applied to a signal line $D_{r1}$ at the order of R→G→R→G every one half of a horizontal period. Taking a horizontal resolution into consideration, the timing of sampling in each horizontal period is determined in compliance with the zigzag form of the signal line so that the timings of sampling in the second and third horizontal periods are delayed from the timing of sampling in the first horizontal period by three seconds of one horizontal period and the same as the timing of sampling in the first horizontal period, respectively.

Figure 13:
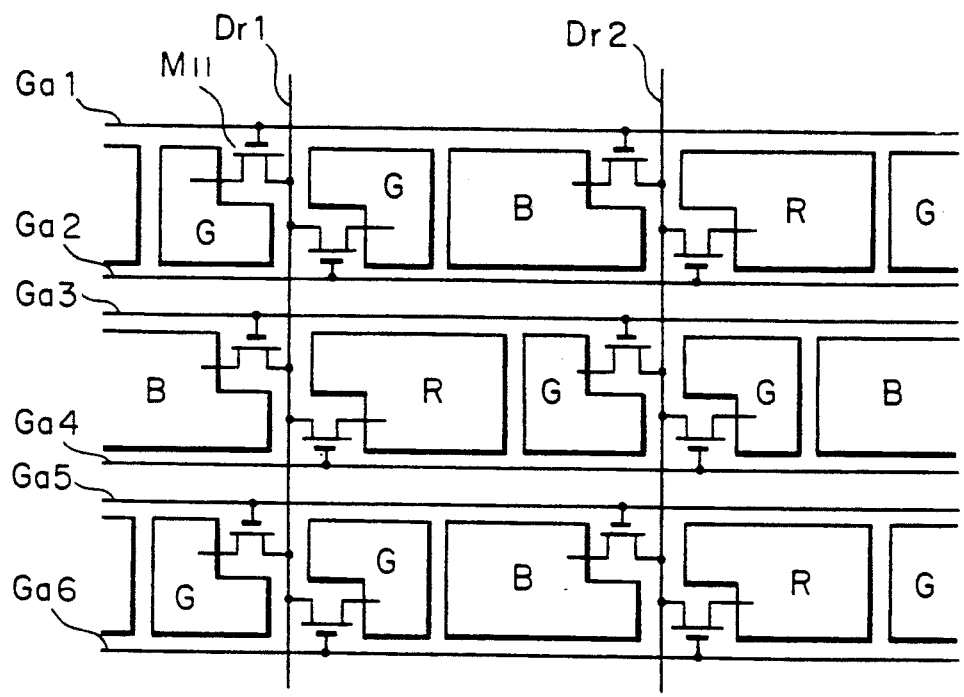

In the embodiment shown in FIG. 13, signal lines extending straightly in a vertical direction are arranged at intervals of 1.5 pixels in a horizontal direction. Each signal line takes the alternate position of or takes alternately a position between non-bisected pixel electrodes and a position between halves (or segments) of a bisected pixel electrode in every row in the vertical direction. To each of the halves of the bisected pixel electrode is connected a pixel transistor a driving ability of which is about one half of that of a transistor driving the non-bisected pixel electrode. Primary-color image signals are sequentially sampled and applied to the signal line $D_{r1}$ at the order of G→G→B→R every one half of a horizontal period. According to the embodiment of FIG. 13, since the signal line straightly extends with no bent portion, the manufacture yield can be improved. Also, an apparent horizontal resolution can be improved in such a manner that green (G) among the three primary colors having the largest luminance component is allotted to the halves or segments of the bisected pixel electrode and the segmental pixel electrodes are driven by image signals which are sampled at timings shifted from each other corresponding the positions of the segmental pixel electrodes.

Figure 14:
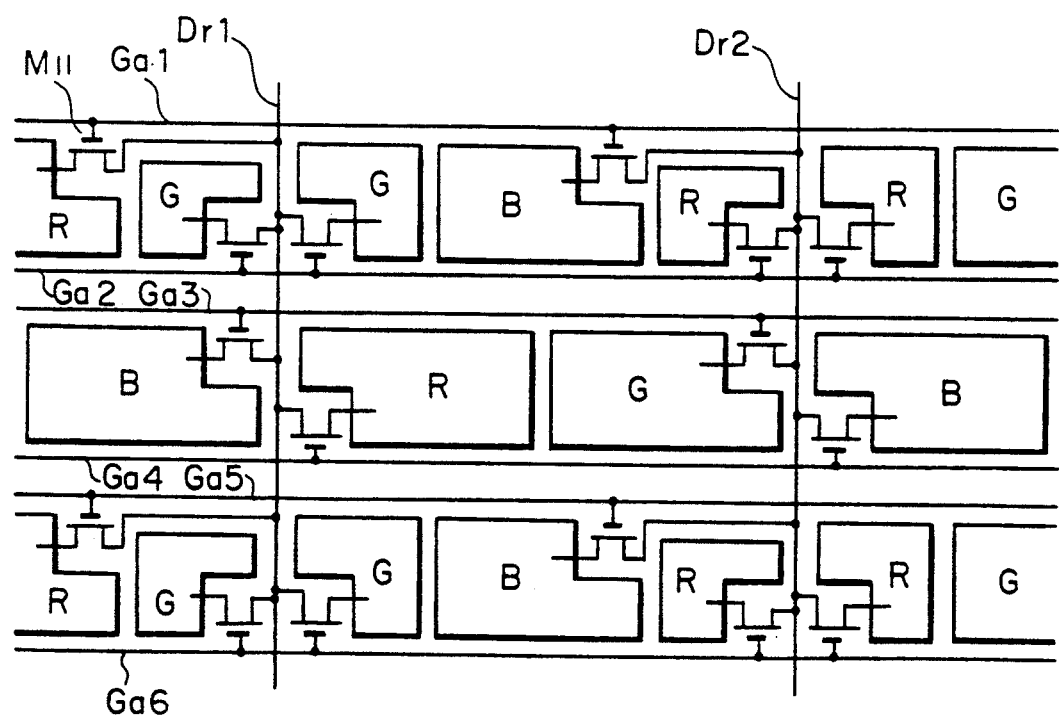

In the embodiment shown in FIG. 14, signal lines extending straightly in a vertical direction are arranged at intervals of two pixels in a horizontal direction. Each signal line bisects a pixel electrode in every two rows in the vertical direction, like the embodiment shown in FIG. 13. The present embodiment is different from the embodiment of FIG. 13 in that halves or segments of the bisected pixel electrode are driven by the same image signal. Therefore, the present embodiment has an effect that the number of scanning lines to be drawn out can be reduced, though the improvement of a horizontal resolution as in the embodiment of FIG. 13 cannot be expected.

Figure 15:
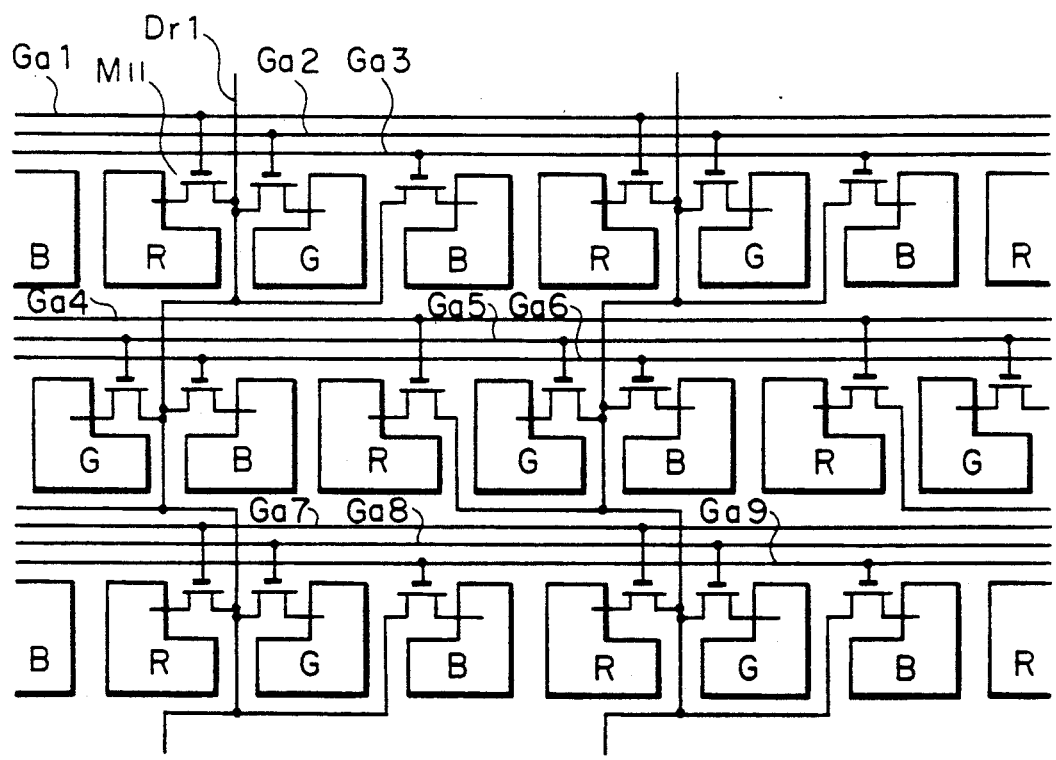

In the embodiment shown in FIG. 15, three scanning lines are provided for pixels in one row and signal lines are arranged at intervals of three pixels. Primary-color signals R, G and B are sequentially sampled every one horizontal period at timings corresponding to the pixels and the signal lines are sequentially driven at timings shifted from each other by one third of one horizontal period. Accordingly, in the case where the pixel arrangement shown in FIG. 15 is applied to the embodiment shown in FIG. 1A or 3, the horizontal scanning circuit requires six sample hold circuits for each signal line. The timing of sampling in each horizontal period is made such that the timings of sampling in the second and third horizontal periods are in advance of the timing of sampling in the first horizontal period by three seconds of one horizontal period and the same as the timing of sampling in the first horizontal period, respectively. Thus, according to the embodiment of FIG. 15, there is an effect that the number of signal lines can be further reduced as compared with the embodiments of FIGS. 9 to 14.

Figure 16:
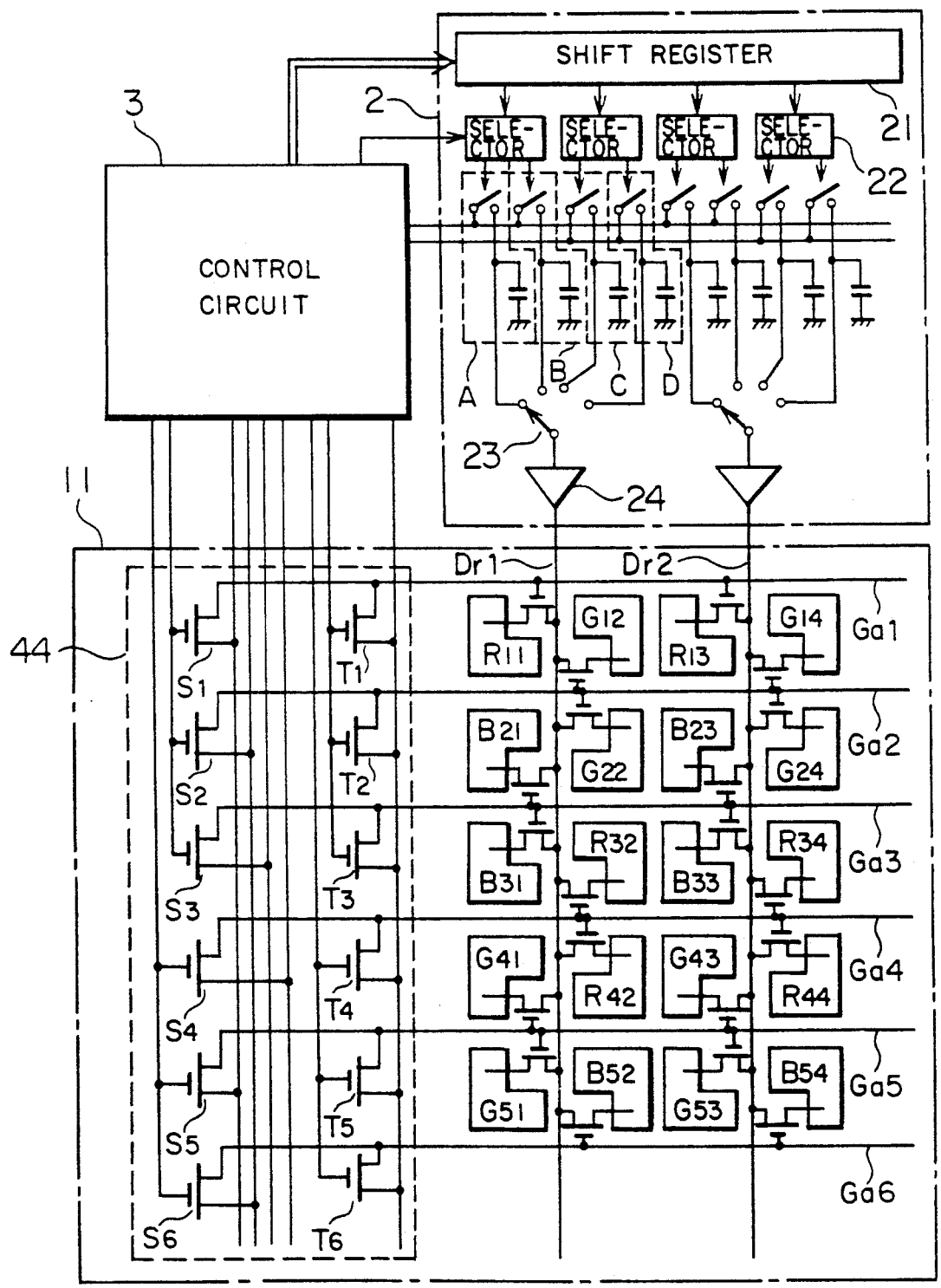
FIG. 16 is a circuit diagram showing the construction of an image display device according to a still further embodiment of the present invention.

FIG. 16 shows the construction of a still further embodiment of the present invention. Luminescence colors including red (R), green (G) and blue (B) are triangularly allotted to pixel electrodes $E_{ij}$. In the triangular arrangement of primaries pixels shown in FIGS. 10 to 14, pixels of the same color are shifted by 1.5 pixels in a horizontal direction every one row. On the other hand, the embodiment shown in FIG. 16 employs a longitudinal triangular arrangement in which the same color is allotted to two pixels adjacent to each other in a vertical direction and the pixels of the same color are shifted by two pixels every one column. Since the construction and operation of a vertical scanning function part 44 are the same as those of the vertical scanning function part 4' shown in FIG. 3, any explanation thereof will be omitted.

Figure 17:
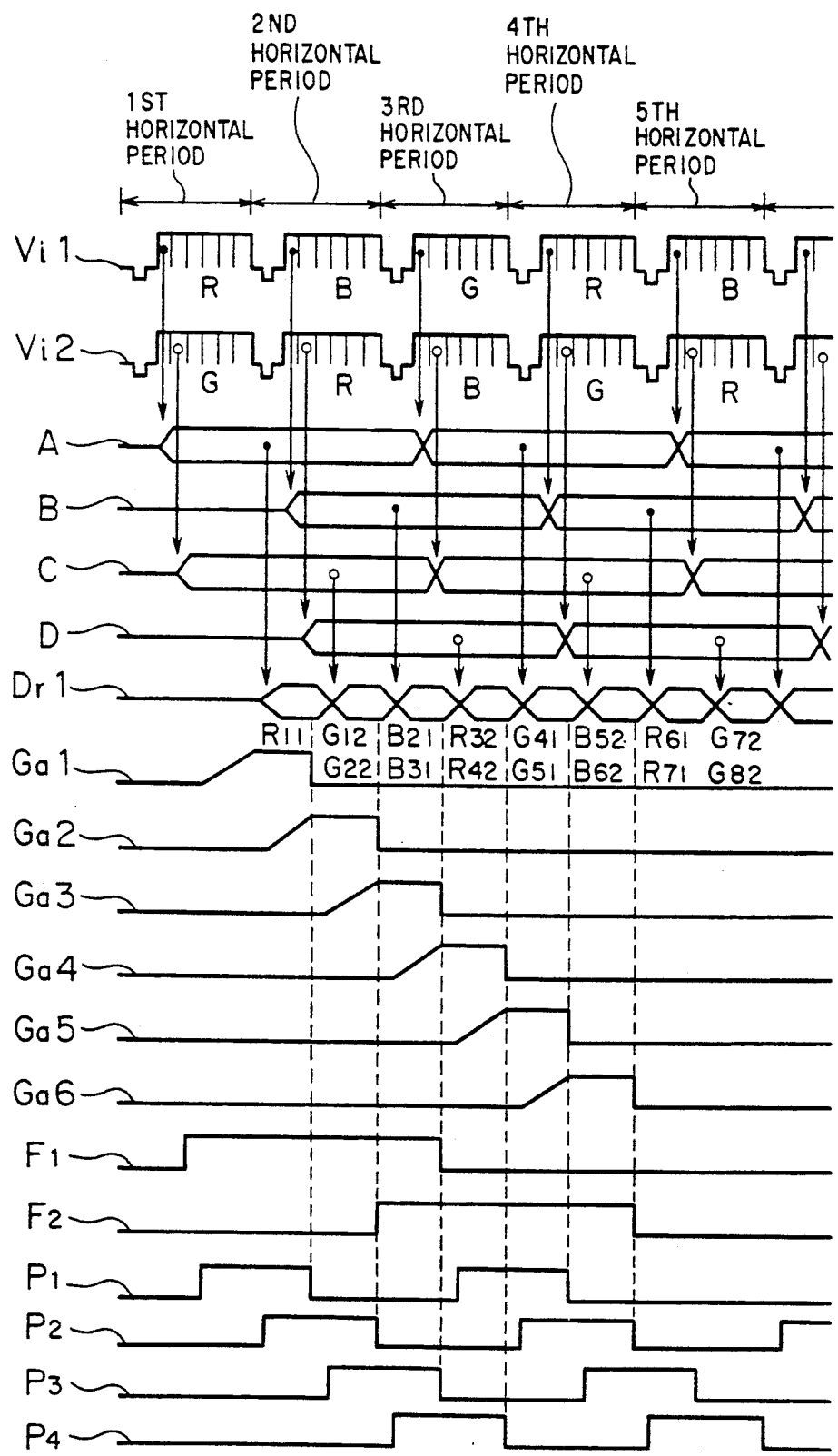
FIGS. 17 and 18 are views showing an example of waveforms for explaining the operation of the embodiment shown in FIG. 16.
Figure 18:
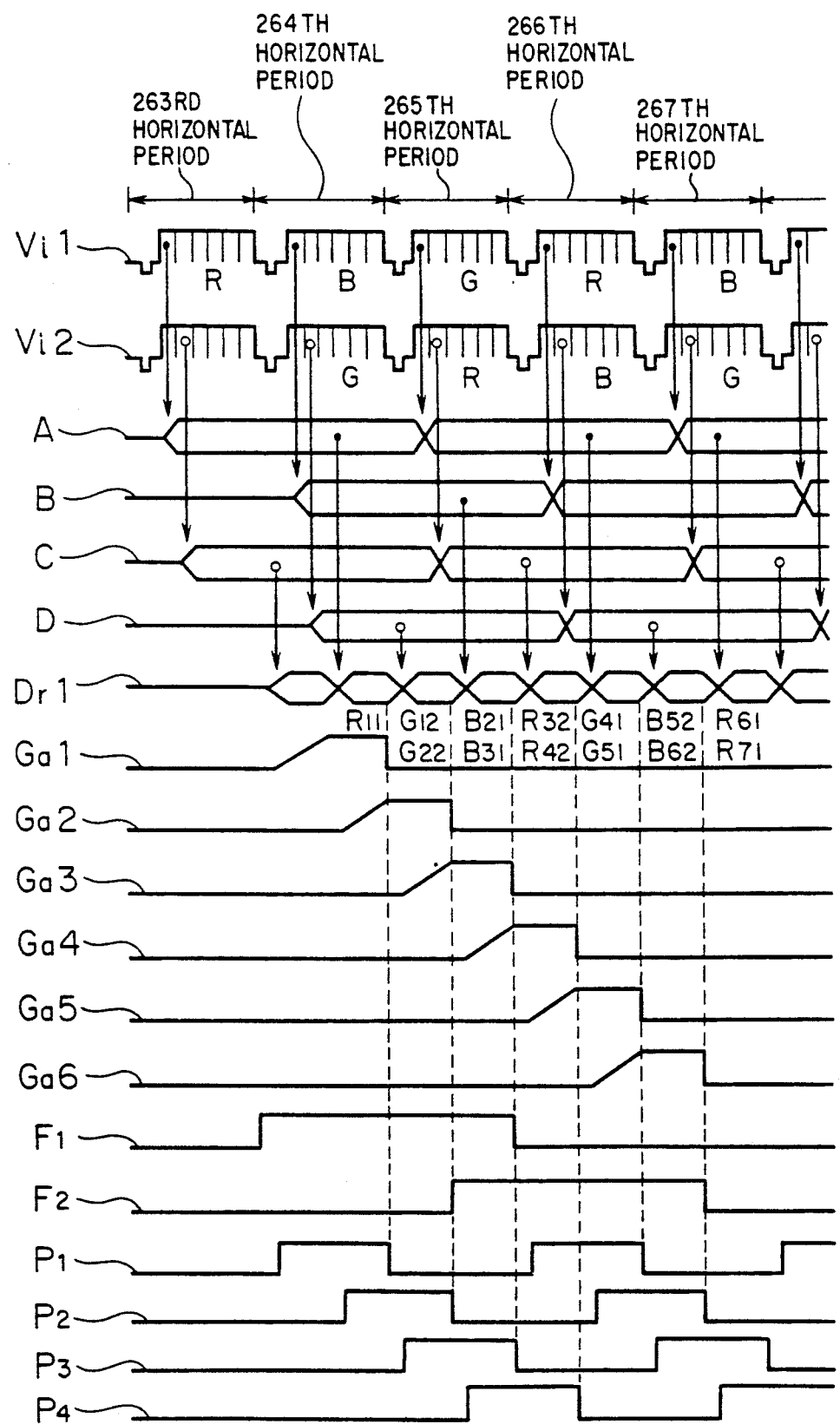

Taking as an example the case where the device is driven by a television signal of NTSC system, the embodiment shown in FIG. 16 will now be explained by virtue of an example of operating waveforms shown in FIGS. 17 and 18. Like the embodiment of FIG. 3, the embodiment of FIG. 16 employs doubled-speed scanning in which two gate buses are scanned sequentially and selectively during one horizontal period. Therefore, the operating waveform example shown in each of FIGS. 17 and 18 is almost the same as that shown in FIG. 4. Accordingly, the following explanation will be made mainly in conjunction with features of the present embodiment different from the embodiment of FIG. 3.

An image (or one frame) of the television signal of NTSC system is constructed by two fields and an interlace scanning is employed in which intervals between scanning lines of the first field are scanned by the second field. The embodiment of FIG. 16 aims at realizing the interlace scanning, thereby improving a vertical resolution. Namely, in the first field shown in FIG. 17, the first scanning electrode $G_{a1}$ and the second scanning electrode $G_{a2}$ are successively selected by television signals in the first horizontal period and the third scanning electrode $G_{a3}$ and the fourth scanning electrode $G_{a4}$ are sequentially selected by television signals in the second horizontal period. On the other hand, in the second field shown in FIG. 18, the first scanning electrode $G_{a1}$ is selected by a television signal in the 263rd horizontal period and the second scanning electrode $G_{a2}$ and the third scanning electrode $G_{a3}$ are sequentially selected by television signals in the 264th horizontal period. In this manner, the interlace scanning is realized.

Figure 19:
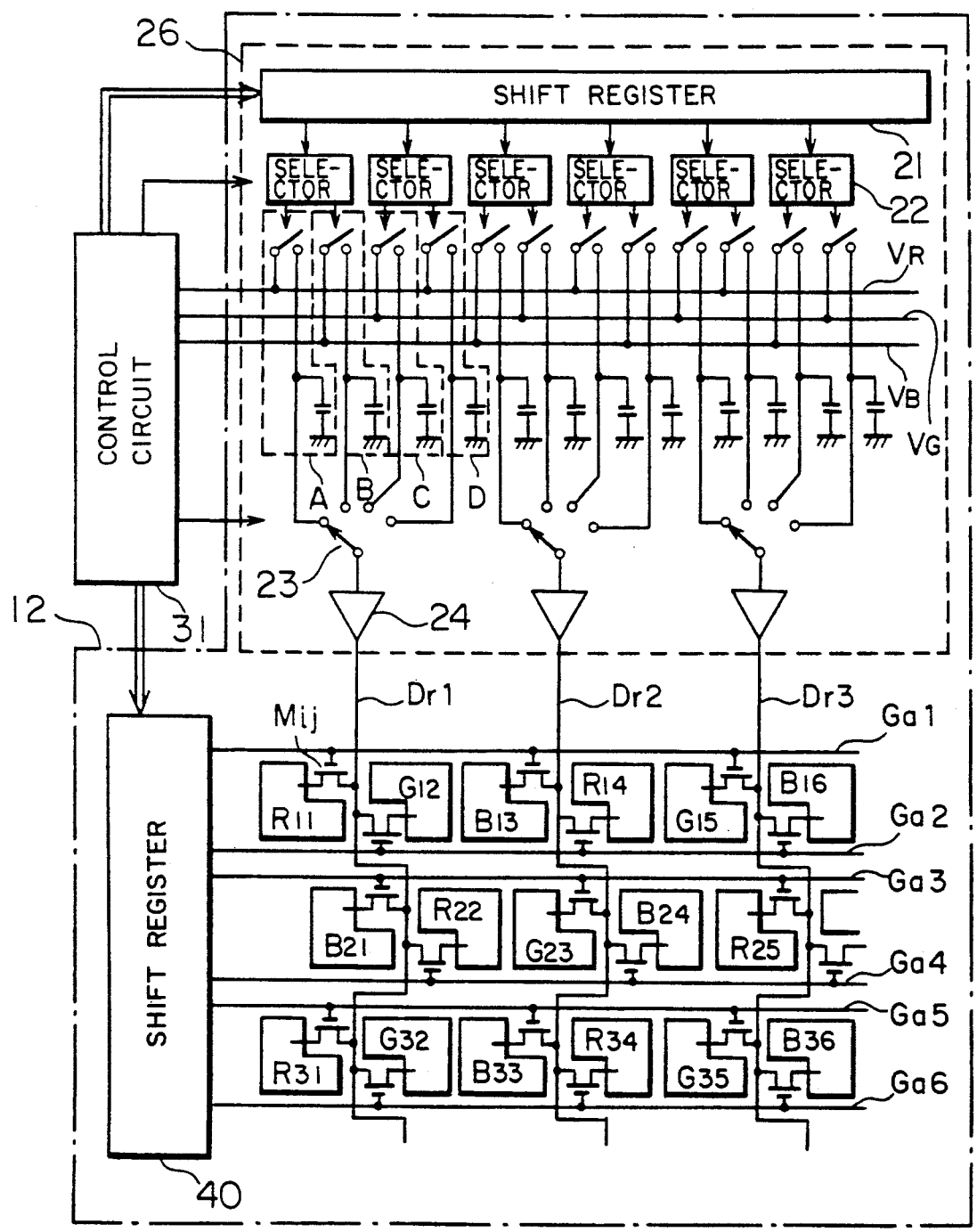
FIG. 19 is a circuit diagram showing the construction of an image display device according to a furthermore embodiment of the present invention.
Figure 20:
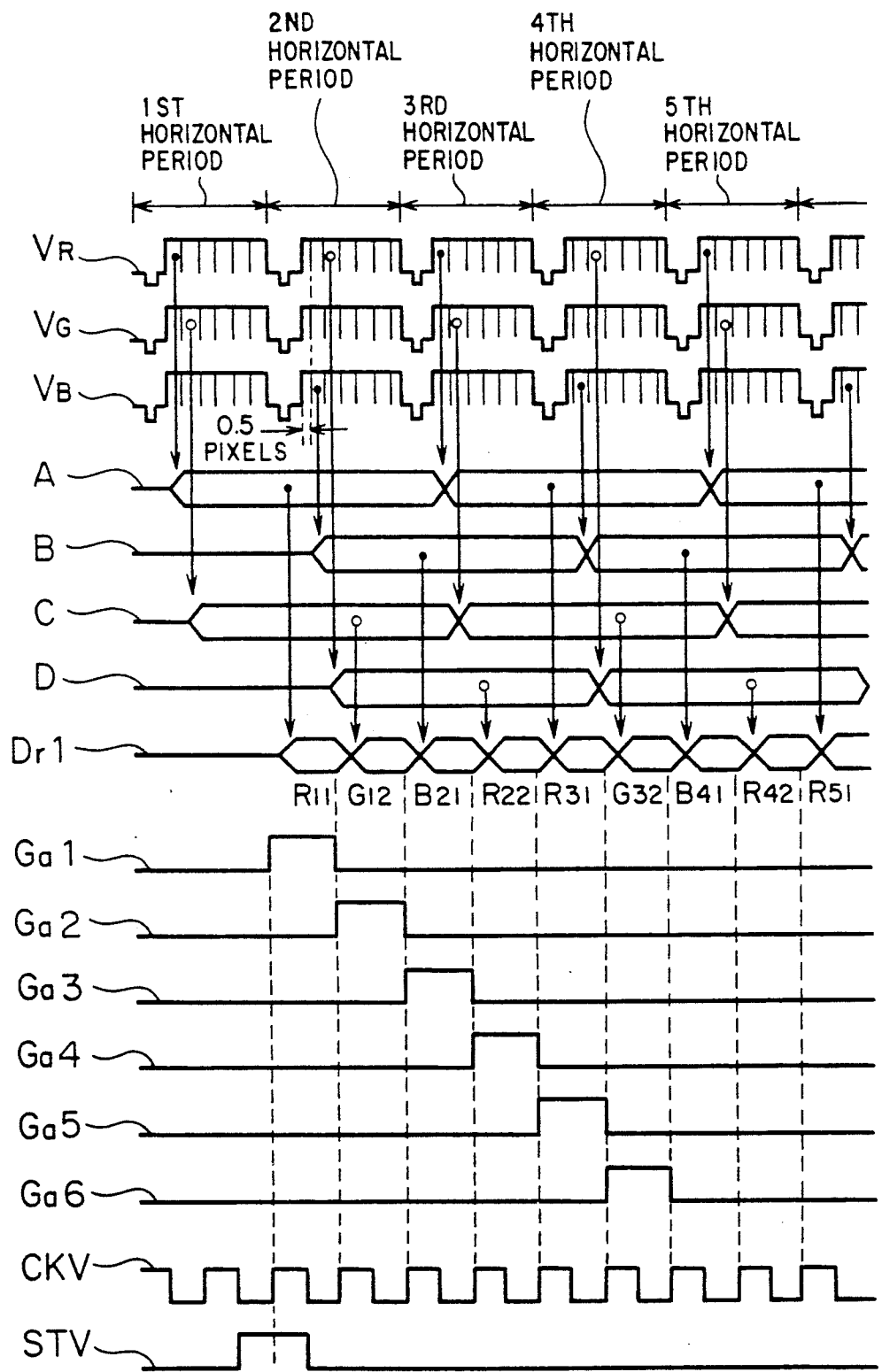
FIG. 20 is a view showing an example of waveforms for explaining the operation of the embodiment shown in FIG. 19.

FIG. 19 shows the construction of a furthermore embodiment of the present invention in which a vertical scanning function part is formed by a shift register 40 and the pixel arrangement shown in FIG. 11 is employed. FIG. 20 shows an example of operating waveforms.

A control circuit 31 applies a clock waveform CKV and a vertical scanning start signal waveform STV to the shift register 40 in accordance with an image display signal inputted so that the shift register 40 outputs sequential selection waveforms as shown in FIG. 20 to scanning lines $G_{a1}$, $G_{a2}$, $G_{a3}$, . . . . It is apparent that those sequential selection waveforms are equivalent to the sequential selection waveforms obtained in the embodiment shown in FIG. 1A. A horizontal scanning circuit 26 has three signal lines $V_R$, $V_G$ and $V_B$ which provide image display signals and are provided corresponding to three primary-color signals. Since the principle of operation of the horizontal scanning circuit 26 is substantially the same as that of the horizontal scanning circuit 2 in the embodiment shown in FIG. 1A explanation thereof will be omitted.

A first difference of the embodiment of FIG. 19 from the embodiment of FIG. 1A is that sample hold circuits A, B, C and D are connected so as to sample the corresponding image display signals, respectively, in accordance with display colors of pixels. A second difference of the present embodiment from the embodiment of FIG. 1A is that the output of a shift register 21 is shifted by a time corresponding to 0.5 pixels every one horizontal period to sample primaries image display signals corresponding to the arrangement of pixels shifted by 0.5 pixel pitches every one row. The shifting of the output of the shift register 21 can be readily realized by shifting the clock waveform applied from the control circuit 31.

Next, taking a liquid crystal display device as an example of the image display device, explanation will be made of a location where the vertical scanning function part 4, 4', 41 or 42 shown in the embodiment shown in FIG. 1A, 3 or 5 is to be formed.

Figure 21:
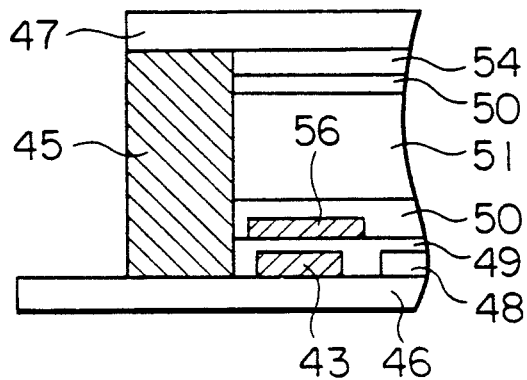
FIG. 21 shows in cross section an embodiment of a liquid crystal display device according to the present invention, especially a location where a vertical scanning function part thereof is to be formed.
Figure 22:
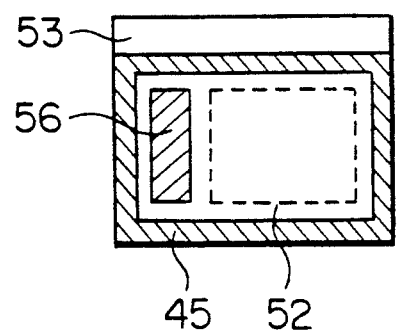
FIG. 22 is a top view of the liquid crystal display device shown in FIG. 21.

FIG. 21 shows in cross section a liquid crystal display device having a vertical scanning function part 43 formed in a liquid crystal filling region, and FIG. 22 is a top view of the device. In FIGS. 21 and 22, reference numeral 56 designates an electrode, numeral 45 a liquid crystal sealing portion, numeral 46 a lower glass plate, numeral 47 an upper glass plate, numeral 48 a pixel transistor, numeral 49 an insulating film, numeral 50 an orientation controlling film, numeral 51 a liquid crystal, numeral 52 an image display part, numeral 53 a portion where signal lines or the like are drawn out, and numeral 54 a common electrode opposing to an electrode 56. In the case where the vertical scanning function part 43 is formed in the liquid crystal filling region, there may be a danger that a DC electric field is applied between the vertical scanning function part 43 and the common electrode 54, thereby deteriorating the liquid crystal 51. In order to prevent such a danger, the embodiment shown in FIG. 21 takes a structure in which the electrode 56 is formed on the vertical scanning function part 43 through the insulating film 49 and the same electric potential is applied to the electrode 56 and the common electrode 54.

Figure 23:
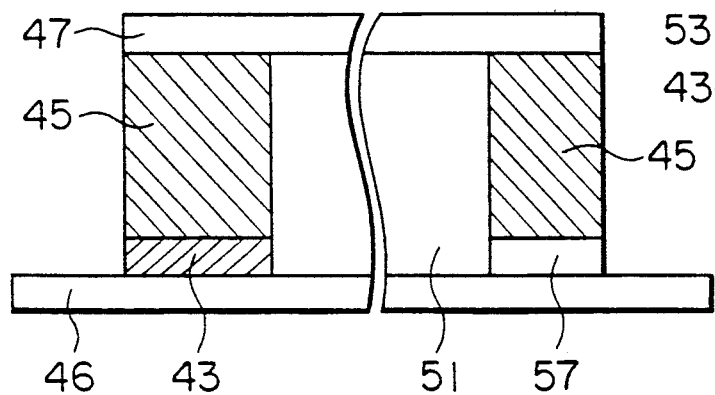
FIG. 23 shows in cross section another embodiment of a liquid crystal display device according to the present invention, especially, a location where a vertical scanning function part thereof is to be formed.
Figure 24:
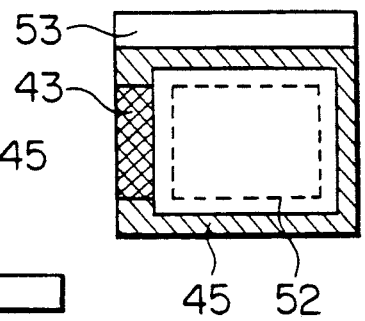
FIG. 24 is a top view of the liquid crystal display device shown in FIG. 23.

FIG. 23 shows in cross section a liquid crystal display device having a vertical scanning function part 43 formed in a liquid crystal sealing region 45, and FIG. 24 is a top view of the device. Components the explanation of which is not necessary are omitted from the illustration of FIG. 23. In the embodiment shown in FIG. 23, in order to keep a lower glass plate 46 and an upper glass plate 47 parallel to each other, thereby preventing display lacking in uniformity, a dammy pattern 57 having a height substantially equal to the vertical scanning function part 43 is provided at that portion of the liquid crystal sealing region 45 where the vertical scanning function part 43 is not formed.

Figure 25:
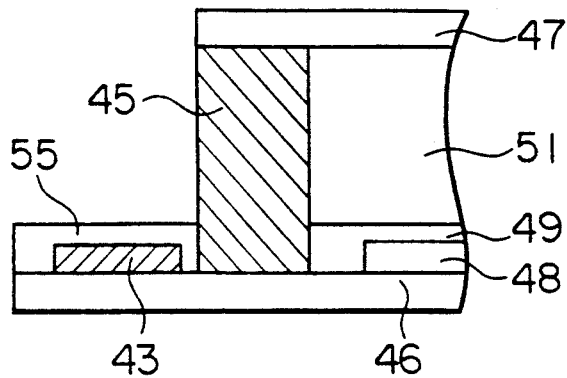
FIG. 25 shows in cross section still another embodiment of a liquid crystal display device according to the present invention, especially, a location where a vertical scanning function part thereof is to be formed.
Figure 26:
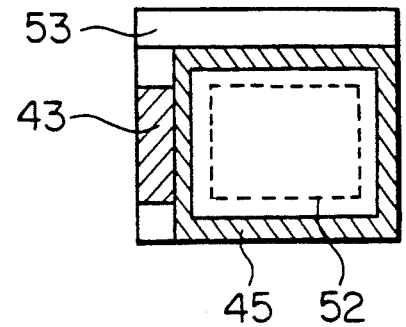
FIG. 26 is a top view of the liquid crystal display device shown in FIG. 25.

FIG. 25 shows in cross section a liquid crystal display device having a vertical scanning function part 43 formed outside of a liquid crystal sealing region 45, and FIG. 26 is a top view of the device. In order to protect the vertical scanning function part 43 formed outside of the liquid crystal sealing region 45, a protection film 55 is provided which is thicker than an insulating film 49 protecting a pixel transistor 48 which is formed in each pixel in a liquid crystal filling region.

According to the embodiments shown in FIGS. 21, 23 and 25, there can be obtained a liquid crystal display device which is stable in operation and excellent in display quality.

The foregoing explanation has been made in conjunction with the case where the vertical scanning function part is formed simultaneously with the pixel transistor on the active matrix substrate. However, it is apparent that the present invention is also applicable to the case where the vertical scanning function part and the pixel transistor are formed through different processes. For example, a pixel transistor may be made of a-Si (amorphous silicon) while a vertical scanning function part is made of p-Si (polycrystalline silicon). Also, there may be employed a structure in which a vertical scanning function part formed on a monocrystalline Si substrate is placed on a lower glass plate having a pixel transistor formed thereon and electrodes are thereafter interconnected.

Figure 27:
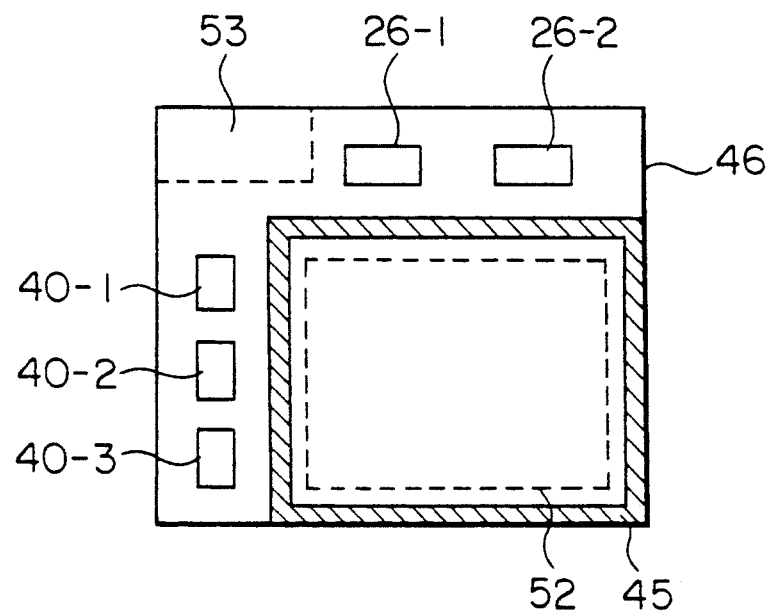
FIG. 27 is a top view of a further embodiment of a liquid crystal display device according to the present invention.
Figure 28:
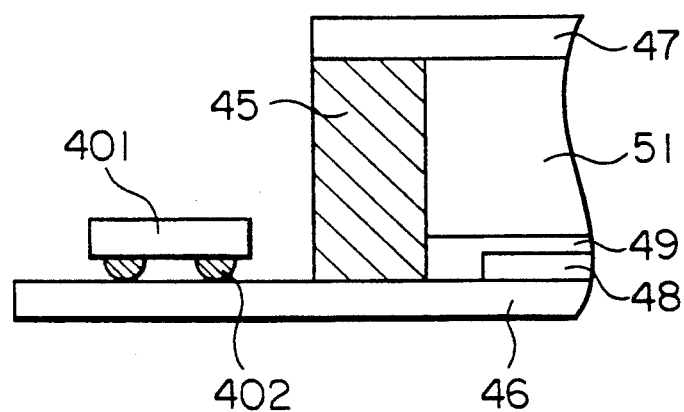
FIG. 28 shows in cross section the liquid crystal display of FIG. 27, especially, a location where a vertical scanning function part thereof is to be formed.

FIG. 27 shows in cross section a liquid crystal display device in which three vertical scanning IC chips 40-1, 40-2 and 40-3 and two horizontal scanning IC chips 26-1 and 26-2 constructed by shift registers as used in FIG. 19 are connected directly on a lower glass plate 46 having pixel transistors 48 formed thereon. FIG. 28 is a top view of the device. An IC chip 401 shown in FIG. 28 may be any one of the vertical and horizontal scanning IC chips and is made of a monocrystalline Si substrate. The IC chip 402 is connected at input and output terminal portions thereof to electrodes on the lower glass plate 46 through bumps 402. By thus connecting the IC chips directly onto the lower glass plate, the number of connection lines between the lower glass plate 46 having the pixel transistors formed thereon and the external driving circuit can be reduced, thereby providing an effect similar to the effect obtained in the case where the vertical scanning function part is formed on the lower glass plate 46.

FIG. 29 is a block diagram showing an example in which a color television is constructed by use of the image display device presented here. Broadcasting electric waves are received by an antenna 61 and are converted by a tuner IF (intermediate frequency amplification) 62 into an audio signal and a video signal. The audio signal is applied to an audio processing circuit 63. The video signal is applied to a primaries decoder 64 and a sync separator circuit 66 which in turn provide a primaries video signal and a sync signal, respectively. The primaries video signal is converted by a gamma correction circuit 65 into a primaries image signal suitable for the voltage versus luminance characteristic of an image display device 67 according to the present invention and is thereafter inputted together with the sync signal to the image display device 67 to reproduce a color television image.

FIG. 30 is a block diagram showing an example in which a color monitor is constructed by use of an image display device 67 according to the present invention. The operation of the example shown in FIG. 30 is substantially similar to that of the example of FIG. 29 excepting that a VTR (video tape recorder) or VDP (video disk player) 68 is used as a video signal supplying device in place of the tuner IF used in the example of FIG. 29.

Figure 31:
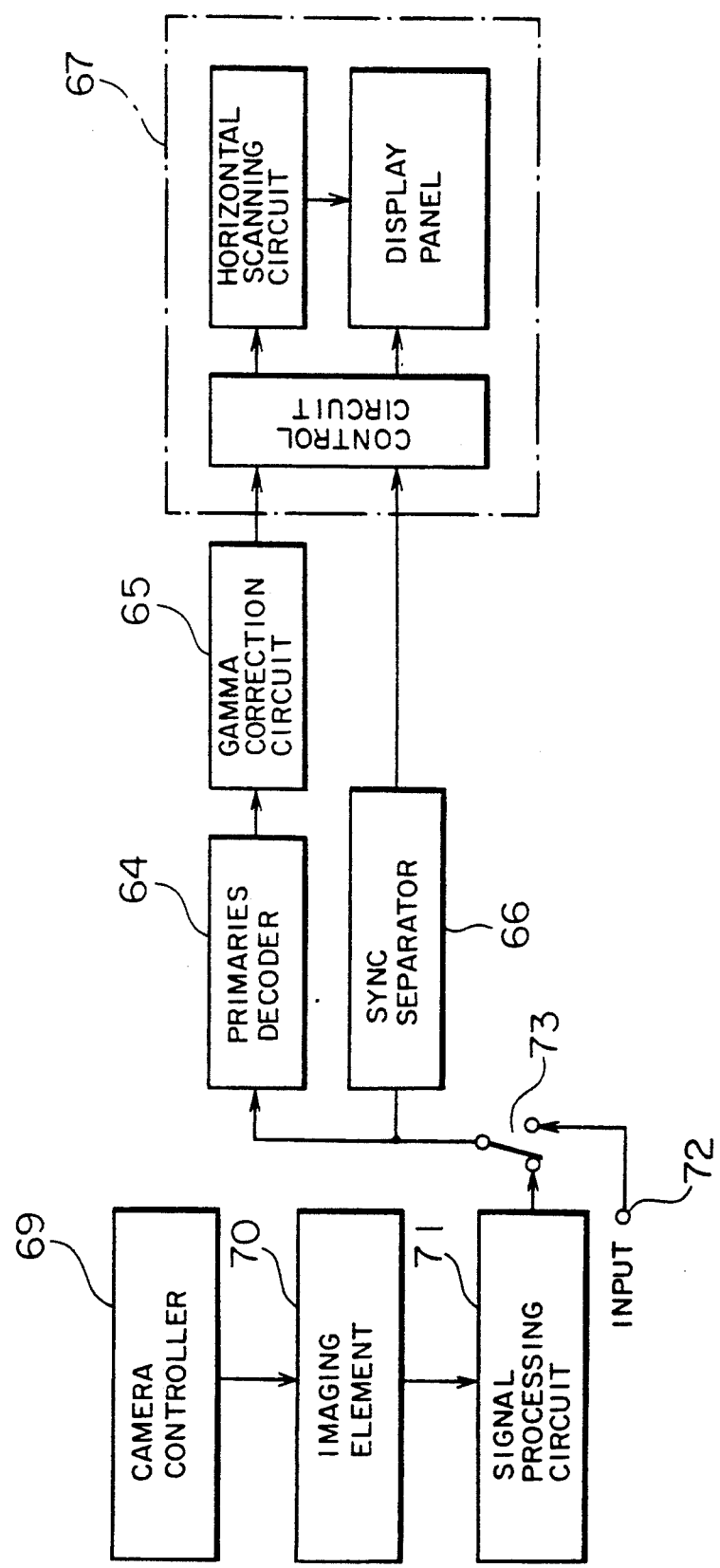
FIG. 31 is a block diagram of a color view finder for monitor of a video camera in which an image display device according to the present invention is used.

FIG. 31 is a block diagram showing an example in which a color view finder for monitor of a video camera is constructed by use of an image display device 67 according to the present invention. The operation of the example shown in FIG. 31 is substantially similar to that of the example of FIG. 29 excepting that in place of the output video signal of the tuner IF used in the example shown in FIG. 29 is used a video signal which is obtained through change-over by a switch 73 between a video signal obtained from a signal processing circuit 71 inputted with the output of an imaging element 70 driven by a camera controller 69 and a video signal applied from an external input terminal 72.

According to the examples shown in FIGS. 29, 30 and 31, there can be provided a color television, color monitor and color view finder which are low in cost and compact. Monochromatic display can be readily realized by omitting the primaries decoders from the examples shown in FIGS. 29, 30 and 31.

In the foregoing embodiments, the same reference numeral or symbol represents the same or equivalent component. It is again confirmed that reference numerals 1, 1' and 11 designate active matrix display panel, numerals 2, 2' and 26 horizontal scanning circuits, numerals 3 and 31 control circuits, numerals 4, 4', 41, 42, 43 and 44 vertical scanning function parts, symbols $S_i$, $T_i$ and $M_{ij}$ MOS transistors, symbol $E_{ij}$ a pixel electrode, numerals 21 and 40 shift registers, numeral 22 a gate circuit or selector for selecting control inputs for sample hold circuits, numeral 23 a switch, numeral 24 a buffer, numeral 25 a bi-directional shift register, numeral 45 a liquid crystal sealing region, numeral 46 a lower glass plate, numeral 47 an upper glass plate, numeral 48 a pixel transistor, numeral 49 an insulating film, numeral 50 an orientation controlling film, numeral 51 a liquid crystal, numeral 52 an image display part, numeral 53 a signal line drawing-out portion, numeral 54 a common electrode, and numeral 56 an electrode.

As has been mentioned above, according to the present invention, a display pixel part is multiplexed to reduce the number of signal lines drawn out of a display panel, thereby reducing the number of external mounted horizontal scanning IC's driving the signal lines while a vertical scanning function is formed on the display panel to reduce the number of lines drawn out of the display panel. As a result, there is an effect that the improvement of the yield concerned in the matter of connection, the lowering of the cost resulting from the reduction in scale of an external mounted driving circuit, and the compactness of the device can be realized.

We claim:

1. A display device comprising a display panel including a plurality of signal lines extending in a vertical direction, a plurality of scanning lines extending in a horizontal direction, and display elements disposed as pixels at respective intersections of a matrix formed by said signal lines and said scanning lines, said signal lines, said scanning lines and said display elements being disposed on a substrate, in which the total number of the display elements as pixels arranged in the horizontal direction is larger than the total number of said signal lines, and the total number of the display elements as pixels arranged in the vertical direction is smaller than the total number of said scanning lines, wherein each of said signal lines is disposed between pixel electrodes to drive adjacent display elements as pixels, each of said signal lines is operatively connected to at least two pixels adjacent to each other in the horizontal direction, and the two adjacent pixels in the horizontal direction are operatively connected to different scanning lines, respectively, whereby each of the two adjacent pixels in the horizontal direction is driven by a different combination of said signal lines and a different respective one of said different scanning lines.

2. A display device according to claim 1, further comprising a vertical scanning function part provided on said substrate for driving said scanning lines.

3. A display device according to claim 1, wherein said display panel includes a glass substrate and an opposite common electrode filling therebetween a liquid crystal making up said display elements and includes therein a vertical scanning function part for driving said scanning lines on said substrate provided with an electrode above said function part through an insulating film below said liquid crystal, and means for keeping said electrode at equipotential with said opposite electrode.

4. A display device according to claim 1, wherein a vertical scanning function part for driving said scanning lines is provided on a lower glass substrate in a liquid crystal sealing region and a dummy pattern having a thickness substantially equal to the thickness of said vertical scanning function part is provided on said lower glass substrate at a portion of said liquid crystal sealing region where said vertical scanning function part is not present.

5. A display device according to claim 1, wherein a vertical scanning function part for driving said scanning lines is provided on a lower glass substrate outside of a liquid crystal sealing region, and an insulating protecting film thicker than an insulating film protecting a pixel transistor which is formed in each pixel film is formed on said vertical scanning function part.

6. A display device according to claim 1, wherein pixels providing three primary colors of red, green and blue are successively arranged in the horizontal direction, the pixel arrangement in the second row of said matrix is rightwards (or leftwards) shifted by one pixel with respect to the pixel arrangement in the first row of said matrix, the pixel arrangement in the third row of said matrix is rightwards (or leftwards) shifted by two pixels with respect to the pixel arrangement in the first row of said matrix, the pixel arrangement in the fourth row of said matrix is the same as the pixel arrangement in the first row of said matrix, said signal lines extend straightly, and colors displayed by two pixels in one row connected to one signal line are periodically changed every three rows.

7. A display device according to claim 1, wherein pixels providing three primary colors of red, green and blue are successively arranged in the horizontal direction, the pixel arrangement in the second row of said matrix is rightwards (or leftwards) shifted by 1.5 pixels with respect to the pixel arrangement in the first row of said matrix, the pixel arrangement in the third row of said matrix is the same as the pixel arrangement in the first row of said matrix, a signal line passing between two pixel electrodes is rightwards (or leftwards) shifted by 0.5 pixels every one row and is leftwards (or rightwards) shifted by 2.5 pixels every six rows, and a relation in arrangement between signal lines and pixels in the seventh row of said matrix is the same as that in the first row of said matrix.

8. A display device according to claim 1, wherein pixels providing three primary colors of red, green, and blue are successively arranged in the horizontal direction, the pixel arrangement in the second row of said matrix is rightwards (or leftwards) shifted by 1.5 pixels with respect to the pixel arrangement in the first row of said matrix, the pixel arrangement in the third row of said matrix is the same as the pixel arrangement in the first row of said matrix, a signal line passing between two pixel electrodes is disposed such that the signal line in the second row of said matrix is rightwards (or leftwards) shifted by 0.5 pixels or 1.5 pixels with respect to the signal line in the first row of said matrix, and a relation in arrangement between signal lines and pixels in the third row of said matrix is the same as that in the first row of said matrix.

9. A display device according to claim 1, wherein pixels providing three primary colors of red, green and blue are successively arranged in the horizontal direction, the width of the pixel for green is one half of the width of each of the pixels for red and green, the number of the pixels for green is two times as large as the number of the pixels for red or blue, the pixels are arranged in the horizontal direction with one pixel for red, two small pixels for green and one pixel for blue taken as one display unit, the pixel arrangement in the second row of said matrix is rightwards (or leftwards) shifted by a half of said one display unit with respect to the pixel arrangement in the first row of said matrix, and the signal line straightly passes between two small pixels for green and between a pixel for red and a pixel for blue.

10. A display device according to claim 1, wherein pixels providing three primary colors of red, green and blue are successively arranged in the horizontal direction, the pixel arrangement in the second row of said matrix is rightwards (or leftwards) shifted by 1.5 pixels with respect to the pixel arrangement in the first row of said matrix, the signal line is connected to three pixels for red, green and blue continuously arranged in the horizontal direction, the signal line in the first row of said matrix is rightwards (or leftwards) shifted by 0.5 pixels or 1.5 pixels with respect to the signal line in the first row of said matrix, a relation in arrangement between signal lines and pixels in the third row of said matrix is the same as that in the first row of said matrix, and three pixels for red, green and blue continuously arranged in the horizontal direction are connected to different scanning lines.

11. A display device according to claim 1, wherein a vertical scanning function part for driving said scanning lines is constructed by a vertical scanning IC chip including a shift register, and said IC chip is connected at input and output terminal portions thereof to said scanning lines through bumps.

12. A display device comprising a display panel and a driving circuit therefor, said display panel including a plurality of signal lines extending in a vertical direction, a plurality of scanning lines extending in a horizontal direction, and display elements disposed as pixels at respective intersections of a matrix formed by said signal lines and said scanning lines, said signal lines, said scanning lines and said display elements being disposed on a substrate, in which said driving circuit includes a horizontal scanning circuit for dividing the pixels in one row arranged in the horizontal direction into a plurality of groups, for sampling pixel information for the plurality of groups from a video signal for one row time-serially sent and containing two-dimensional image information, and for delivering time-serially the pixel information for the plurality of groups to drive said signal lines during a period of time when the video signal for one row is sent, wherein the total number of said display elements as pixels arranged in one row in the horizontal direction is larger than the total number of said signal lines, and each of said scanning lines is operatively connected to at least two pixels adjacent to each other of one group in the one row and the at least two adjacent pixels of the one group are operatively connected to different signal lines, whereby each of the at least two adjacent pixels of the one group is driven by a different combination of one of said scanning lines and a different respective one of said different signal lines.

13. A display device according to claim 12, wherein the plurality of groups in the one row are respectively connected to different scanning lines.

14. A display device according to claim 12, wherein the total number of said display elements as pixels arranged in the vertical direction is smaller than the total number of said scanning lines.

15. A display device comprising a display panel including display elements disposed as pixels at intersections of a predetermined even number 2N of vertical columns with N being an integer and horizontal rows of a matrix on a substrate, left side and right side vertically-scanning sections being provided on a left side and a right side horizontally of said matrix on said substrate, and a horizontal scanning section being provided vertically adjacent to said matrix on said substrate, a predetermined number N of signal lines being provided along said even number 2N of vertical columns wherein all left side signal lines are in common with all right side signal lines, respectively, said vertical columns being numbered sequentially from left to right horizontally of said matrix as the 1st to the 2Nth vertical columns, respectively, gate controllable switching means having respective control gates disposed along each of said vertical columns in accordance with intersections with said matrix with each of said switching means being adapted for operatively connecting the respective display elements to the respective vertical signal line portion along each column, left side and right side vertical scanning lines being provided along said matrix rows respectively for vertically scanning said switching means, said left side vertical scanning lines being connected to control gates of said switching means disposed in accordance with the matrix intersections of the respective rows and said 1st to Nth columns, said right side vertical scanning lines being connected to control gates of said switching means disposed in accordance with the matrix intersections of the respective rows and said $(N+1)$th to the 2Nth columns, said left side and right side vertically-scanning sections, respectively, being connected to said left side and right side vertical scanning lines for selectively enabling said lines to enable said switching means connected thereto, and said horizontal scanning section having N output terminals connected to said N number of signal lines for applying video signals therethrough to said display elements through said enabled switching means, wherein a total number N of connection lines connecting said output terminals to said signal lines is one half of the total number 2N of said vertical signal lines.

* * * * *